(12) United States Patent
Tessien et al.

(10) Patent No.: US 7,448,790 B2
(45) Date of Patent: Nov. 11, 2008

(54) CAVITATION FLUID CIRCULATORY SYSTEM FOR A CAVITATION CHAMBER

(75) Inventors: Ross Alan Tessien, Nevada City, CA (US); Dario Felipe Gaitan, Nevada City, CA (US); David G. Beck, Tiburon, CA (US)

(73) Assignee: Impulse Devices, Inc., Grass Valley, CA (US)

( * ) Notice: Subject to any disclaimer, the term of this patent is extended or adjusted under 35 U.S.C. 154(b) by 518 days.

(21) Appl. No.: 11/001,720

(22) Filed: Dec. 1, 2004

(65) Prior Publication Data

US 2006/0034705 A1 Feb. 16, 2006

Related U.S. Application Data

(63) Continuation-in-part of application No. 10/961,353, filed on Oct. 7, 2004, which is a continuation-in-part of application No. 09/448,753, filed on Nov. 24, 1999, now abandoned.

(51) Int. Cl.
*B01F 11/00* (2006.01)
(52) U.S. Cl. .................. 366/114; 366/136; 366/182.2; 366/182.3; 366/182.4; 366/192
(58) Field of Classification Search .............. 366/108, 366/114, 115, 136, 137, 182.2–182.4, 192; 95/30, 241, 266
See application file for complete search history.

(56) References Cited

U.S. PATENT DOCUMENTS 3,762,992 A 10/1973 Hedstrom (Continued)

FOREIGN PATENT DOCUMENTS

| GB | 774052 | 5/1957 |
| GB | 825026 | 12/1959 |
| WO | WO 97/49274 | 12/1997 |
| WO | WO 01/39200 | * 5/2001 |

OTHER PUBLICATIONS

M. Dan et al., Ambient Pressure Effect on Single-Bubble Sonoluminescence, Physical Review Letters, Aug. 30, 1999, pp. 1870-1873, vol. 83, No. 9, Publisher: The American Physical Society, Published in: US.

(Continued)

*Primary Examiner*—David L Sorkin
(74) *Attorney, Agent, or Firm*—C. Brandon Browning; Maynard Cooper & Gale, PC

(57) ABSTRACT

A method and apparatus of circulating cavitation fluid within a cavitation fluid circulatory system is provided. The system provides a means of circulating the cavitation fluid through a cavitation chamber, before or during cavitation chamber operation, as well as a means of draining and filling the chamber with minimal, if any, exposure of the cavitation fluid to the outside environment. The apparatus includes a network of conduits coupling the cavitation chamber to a cavitation fluid reservoir and at least one external fluid pump. Preferably the cavitation fluid reservoir serves the dual function of fluid reservoir and degassing chamber. Manipulation of various valves within the conduit network allows the cavitation fluid to either be pumped from the reservoir into the cavitation chamber or from the cavitation chamber into the reservoir. During cavitation chamber operation, the same pump and conduit network can be used to continuously or intermittently circulate the cavitation fluid through the degassing system. A vacuum pump coupled to the degassing system can operate continuously or intermittently during system degassing. In another aspect, the cavitation fluid circulation system includes a bubble trap immediately following the fluid pump, thus providing a means of capturing bubbles generated during the pumping operation. In yet another aspect, the cavitation fluid circulation system includes a filter, preferably for removing contaminants that could disrupt the cavitation process. In yet another aspect, the cavitation fluid circulation system includes a heat exchange system, thus allowing the temperature of the cavitation fluid to be controlled.

15 Claims, 19 Drawing Sheets

U.S. PATENT DOCUMENTS

| | | | |
|---|---|---|---|
| 4,333,796 | A | 6/1982 | Flynn |
| 4,339,247 | A | 7/1982 | Faulkner et al. |
| 4,563,341 | A | 1/1986 | Flynn |
| 5,523,058 | A | 6/1996 | Umemura et al. |
| 5,585,044 | A * | 12/1996 | Kawakami et al. ............. 261/1 |
| 5,658,534 | A | 8/1997 | Desborough et al. |
| 5,659,173 | A | 8/1997 | Putterman et al. |
| 5,858,104 | A | 1/1999 | Clark |
| 2005/0135532 | A1* | 6/2005 | Taleyarkhan et al. ........ 376/100 |

OTHER PUBLICATIONS

R. Battino et al., Apparatus for Rapid Degassing of Liquids, Part III, 1971.

Barber et al., Resolving the Picosecond Characteristics of Synchronous Sonoluminescence, J. Acoust. Soc. Am., May 1992, pp. 3061-3063, vol. 91, No. 5, Publisher: Acoustical Society of America, Published in: US.

Gaitan et al, Sonoluminescence and Bubble Dynamics for a Single, Stable, Cavitation Bubble, J. Acoust. Soc. Am., Jun. 1992, pp. 3166-3183, vol. 91, No. 6, Publisher: Acoustical Society of America.

Crum, Sonoluminescence, Physics Today, Sep. 1994, pp. 22-29, Publisher: American Institute of Physics, Published in: US.

Young, Sonoluminescence from Water Containing Dissolved Gases, J. Acoust. Soc. Am., Jul. 1976, pp. 100-104, vol. 60, No. 1, Publisher: Acoustical Society of America, Published in: US.

Sehgal et al., Sonoluminescence Intensity as a Function of Bulk Solution Temperature, Phys. Chem., 1980, pp. 525-528, vol. 84, No. 5, Publisher: American Chemical Society, Published in: US.

Walton et al., Sonoluminescence, Advances in Physics, 1984, pp. 595-660, vol. 33, No. 6, Published in: US.

Barber, Synchronous Picosecond Sonoluminescence, Dissertation, 1992, pp. 1-130, Publisher: University of California, Los Angeles, Published in: US.

Bollinger, Ultra Cavitation, http://wiretap.area.com/Gopher/Library/Article/Sci/cavitate.ult, Sep. 17, 2001, pp. 1-26.

Hilgenfeldt et al., Water Temperature Dependence of Single Bubble Sonoluminescence, Physical Review Letters, 1998, pp. 1332-1335, vol. 80, No. 6, Publisher: The American Physical Society, Published in: US.

* cited by examiner

CAVITATION FLUID CIRCULATORY SYSTEM FOR A CAVITATION CHAMBER

REFERENCE TO RELATED APPLICATIONS

This application is a continuation-in-part of U.S. patent application Ser. No. 10/961,353, filed Oct. 7, 2004, which is a continuation-in-part of U.S. patent application Ser. No. 09/448,753, filed Nov. 24, 1999 now abandoned.

FIELD OF THE INVENTION

The present invention relates generally to sonoluminescence and, more particularly, to a cavitation fluid circulatory system for use with a sonoluminescence cavitation chamber.

BACKGROUND OF THE INVENTION

Sonoluminescence is a well-known phenomena discovered in the 1930's in which light is generated when a liquid is cavitated. Although a variety of techniques for cavitating the liquid are known (e.g., spark discharge, laser pulse, flowing the liquid through a Venturi tube), one of the most common techniques is through the application of high intensity sound waves.

In essence, the cavitation process consists of three stages; bubble formation, growth and subsequent collapse. The bubble or bubbles cavitated during this process absorb the applied energy, for example sound energy, and then release the energy in the form of light emission during an extremely brief period of time. The intensity of the generated light depends on a variety of factors including the physical properties of the liquid (e.g., density, surface tension, vapor pressure, chemical structure, temperature, hydrostatic pressure, etc.) and the applied energy (e.g., sound wave amplitude, sound wave frequency, etc.).

Although it is generally recognized that during the collapse of a cavitating bubble extremely high temperature plasmas are developed, leading to the observed sonoluminescence effect, many aspects of the phenomena have not yet been characterized. As such, the phenomena is at the heart of a considerable amount of research as scientists attempt to not only completely characterize the phenomena (e.g., effects of pressure on the cavitating medium), but also its many applications (e.g., sonochemistry, chemical detoxification, ultrasonic cleaning, etc.). A by-product of this research have been several patents claiming various aspects of the process.

U.S. Pat. No. 4,333,796 discloses a cavitation chamber comprised of a refractory metal such as tungsten, titanium, molybdenum, rhenium or some alloy thereof. Acoustic energy is supplied to the liquid (e.g., lithium or an alloy thereof) within the chamber by six metal acoustic horns coupled to transducers. The tips of the horns project into the chamber while the rearward portion of each horn is coupled to a heat exchanger system, the heat exchanger system withdrawing heat generated by the reactions within the chamber and conducted out of the chamber via the metal horns. The inventors note that by removing heat in this manner, the liquid remains within the chamber, thus avoiding the need to pump the chamber liquid. An external processing system with a combination pump and mixer is disclosed for removing deuterium and tritium gases released from the cavitation zone and trapped within the chamber or tritium gases trapped within the Li-blanket surrounding the chamber and then reintroducing the previously trapped deuterium and tritium into the cavitation zone. Additional deuterium may also be introduced into the mixer.

U.S. Pat. No. 4,563,341, a continuation-in-part of U.S. Pat. No. 4,333,796, discloses a slightly modified, cylindrical cavitation chamber. The chamber is surrounded by an external heating coil which allows the liquid within the chamber to be maintained at the desired operating temperature. The system is degassed prior to operation by applying a vacuum through a duct running through the cover of the chamber. During operation, the inventor notes that graphite, dissolved in the host liquid metal, is converted to diamond. The diamond-rich host material is removed via an outlet duct adjacent to the bottom of the chamber and graphite-rich host material is removed via an outlet duct adjacent to the upper end of the chamber. Additional host material and graphite are added by lowering rods comprised of the host material and graphite, respectively, into the heated chamber.

U.S. Pat. No. 5,659,173 discloses a sonoluminescence system that uses a transparent spherical flask fabricated from Pyrex®, Kontes®, quartz or other suitable glass and ranging in size from 10 milliliters to 5 liters. The inventors disclose that preferably the liquid within the flask is degassed and the flask is sealed prior to operation. In one disclosed embodiment, the cavitation chamber is surrounded by a temperature control system, thus allowing the liquid within the chamber to be cooled to a temperature of 1° C.

U.S. Pat. No. 5,858,104 discloses a shock wave chamber partially filled with a liquid. The remaining portion of the chamber is filled with gas which can be pressurized by a connected pressure source. Acoustic transducers mounted in the sidewalls of the chamber are used to position an object within the chamber. Another transducer mounted in the chamber wall delivers a compressional acoustic shock wave into the liquid. A flexible membrane separating the liquid from the gas reflects the compressional shock wave as a dilation wave focused on the location of the object about which a bubble is formed.

Although a variety of sonoluminescence systems have been designed, typically these systems do not provide a convenient method of draining the cavitation fluid from the cavitation chamber without subjecting the fluid to potential contamination and/or loss. Accordingly, what is needed is a cavitation fluid circulatory system that allows both fluid degassing and chamber drainage. The present invention provides such a system.

SUMMARY OF THE INVENTION

The present invention provides a method and apparatus for circulating cavitation fluid within a closed-loop cavitation fluid circulatory system coupled to a cavitation chamber. The system provides a means of circulating the cavitation fluid through the cavitation chamber, before or during cavitation chamber operation, as well as a means of draining and filling the chamber with minimal, if any, exposure of the cavitation fluid to the outside environment. The apparatus includes a network of conduits coupling the cavitation chamber to a cavitation fluid reservoir and at least one external fluid pump. Preferably the cavitation fluid reservoir serves the dual function of fluid reservoir and degassing chamber. Manipulation of various valves within the conduit network allows the cavitation fluid to either be pumped from the reservoir into the cavitation chamber or from the cavitation chamber into the reservoir. During cavitation chamber operation, the same pump and conduit network can be used to continuously or intermittently circulate the cavitation fluid through the degassing system. A vacuum pump coupled to the degassing system can operate continuously or intermittently during system degassing.

In another aspect of the invention, the cavitation fluid circulation system includes a bubble trap immediately following the fluid pump, thus providing a means of capturing and removing bubbles generated during the pumping operation.

In yet another aspect of the invention, the cavitation fluid circulation system includes a filter, preferably for removing contaminants such as particles that could disrupt the cavitation process.

In yet another aspect of the invention, the cavitation fluid circulation system includes a heat exchange system, thus allowing the temperature of the cavitation fluid to be controlled. The heat exchange system can be used to lower the temperature of the cavitation medium to a temperature less than the ambient temperature. Alternately the heat exchange system can be configured to withdraw excess heat from the cavitation medium, heat generated for example by reactions within the cavitation chamber, or due to the cavitating bubbles, or resulting from the conduction of heat into the medium from the drivers. Alternately the heat exchange system can be configured to heat the cavitation medium to the desired operating temperature, thus promoting specific reactions within the cavitation chamber or maintaining the cavitation medium in the liquid phase (e.g., molten metals or salts).

A further understanding of the nature and advantages of the present invention may be realized by reference to the remaining portions of the specification and the drawings.

DESCRIPTION OF THE SPECIFIC EMBODIMENTS

Figure 1:
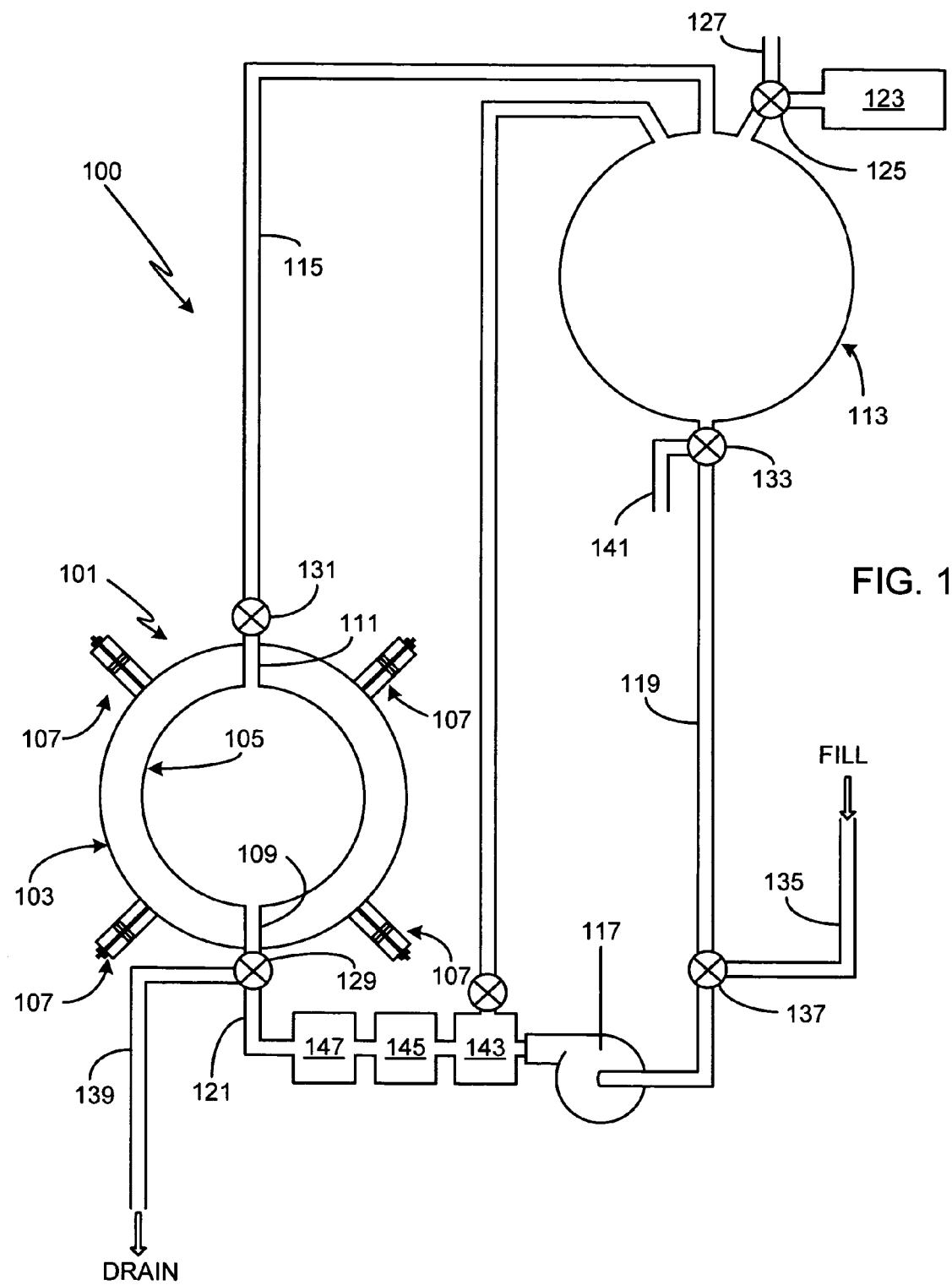
FIG. 1 is an illustration of the primary elements of one embodiment of a cavitation system in accordance with the invention.

FIG. 1 is an illustration of the primary elements of a preferred embodiment of a cavitation system in accordance with the invention. The principal component of system 100 is the sonoluminescence cavitation chamber 101, hereafter referred to as simply a cavitation chamber. Preferably cavitation chamber 101 is spherical, although it will be appreciated that the invention is not so limited and that cavitation chambers of other configurations (e.g., cylindrical, conical, cubical, rectangular, etc.) can also be used with the present invention. One method of fabricating chamber 101 is described in detail in co-pending U.S. patent application Ser. No. 10/925,070, filed Aug. 23, 2004, entitled Method of Fabricating a Spherical Cavitation Chamber, the entire disclosure of which is incorporated herein for any and all purposes.

Illustrated chamber 101 has an outer spherical surface 103 defining the outer diameter of the chamber and an inner spherical surface 105 defining the inner diameter of the chamber. Chamber 101 can be fabricated from any of a variety of metals although there are some constraints placed on the chamber material. First, the material is preferably machinable, thus simplifying the fabrication process. Second, if the chamber is to be operated at a high temperature, the chamber material should have a relatively high melting temperature. Additionally, depending upon the process used to assemble individual chamber pieces together (e.g., brazing), a high melting temperature is preferred as it aids the assembly process. Third, the chamber material should be corrosion resistant, thus allowing the chamber to be used repeatedly and with a variety of liquids. Fourth, the material should be hard enough to allow a good surface finish to be obtained. In one preferred embodiment of the invention, the chamber is fabricated from 17-4 precipitation hardened stainless steel.

With respect to the dimensions of the chamber, both inner and outer diameters, the selected sizes depend upon the intended use of the chamber. For example, smaller chambers are typically preferable for situations in which it is desirable to limit the amount of cavitating medium, for example due to cost or due to limited available energy to drive the cavitation process. On the other hand large chambers, on the order of 8-10 inches or greater, typically simplify experimental set-up and event observation. Thick chamber walls are preferable if the chamber is to be operated at high static pressures. Although the invention is not limited to specific dimensions as previously noted, typical wall thicknesses include 0.25 inches, 0.5 inches, 0.75 inches, 1.5 inches, 2.375 inches, 3.5 inches and 4 inches. Typical outside diameters are in the range of 2-10 inches although larger chambers can be used if sufficient cavitation driving energy is available.

Depending upon the desired cavitation reaction, any of a variety of liquids can be used as the cavitating medium. For example, in one preferred embodiment acetone is used as the cavitating medium. In another embodiment in which the cavitation of the medium results in a nuclear reaction, the cavitating medium is comprised of a host material and a fuel material. The host material is selected from lithium, aluminum, tin, mercury, cadmium, sodium, potassium, gallium, gadolinium indium, lead, bismuth, or an alloy thereof. The fuel material is selected from deuterium, tritium, lithium, or a combination thereof. Alternately the host and fuel materials can be molecularly combined into a single material, e.g., deuterated acetone, heavy water ($D_2O$) and deuterated ethylene glycol. For induced fission reactions, the fuel material is preferably uranium or thorium. In another embodiment in which the cavitation of the medium results in a neutron stripping reaction, preferably between a heavy isotope and a light isotope, the heavy isotope is selected from gadolinium, cadmium, europium, boron, samarium, dysprosium, iridium, mercury, or a mixture thereof while the light isotope is selected from the group consisting of deuterium, tritium, lithium, or a mixture thereof. In this embodiment preferably the heavy isotope has a large thermal neutron capture cross-section, and even more preferably with a thermal neutron capture cross-section of greater than 10 barns.

Figure 2:
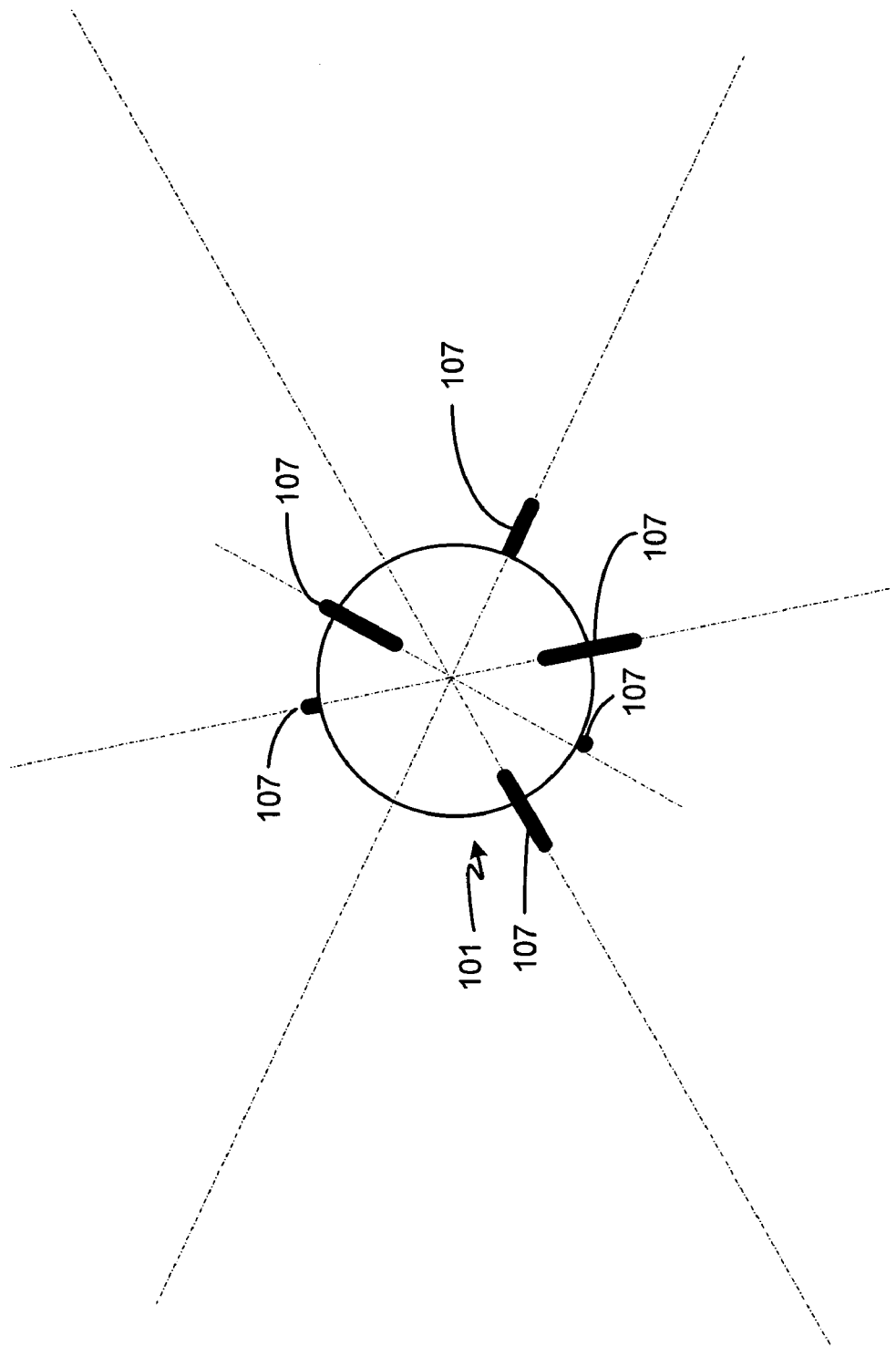
FIG. 2 is an illustration of a spherical cavitation chamber with six mounted acoustic transducers.

Attached to chamber 101 are one or more means of driving energy into the chamber in order to cause the desired cavitation of the liquid contained therein. In a preferred embodiment, acoustic drivers (i.e., transducers) 107 are coupled to the exterior surface 103 of chamber 101. In at least one embodiment of the invention in which the chamber is spherical, six acoustic transducers are mounted to the exterior surface of the cavitation chamber, four mounted to the lower hemisphere and two mounted to the upper hemisphere as illustrated in FIG. 2. Acoustic drivers can be fabricated and mounted, for example, in accordance with co-pending U.S. patent application Ser. No. 10/931,918, filed Sep. 1, 2004, entitled Acoustic Driver Assembly for a Spherical Cavitation Chamber, the entire disclosure of which is incorporated herein for any and all purposes. It will be appreciated that the invention is not limited to a particular number of transducers, nor is the invention limited to having transducers mounted to one or more particular locations. Additionally it should be appreciated that suitable drivers can utilize piezoelectric transducers, magnetostrictive devices, particle discharge systems, pulsed liquid jet generators, or other means.

The operating frequency of the drivers depends upon a variety of factors such as the sound speed of the liquid within the chamber, the shape/geometry of the chamber, the sound field geometry of the drivers, etc. In at least one embodiment, the operating frequency is within the range of 1 kHz to 10 MHz. The selected frequency can be the resonant frequency of the chamber, an integer multiple of the resonant frequency, a non-integer multiple of the resonant frequency, or periodically altered during operation, preferably by less than ±10%.

A closed-loop cavitation fluid circulatory system, as described in detail below relative to FIG. 1 and FIGS. 3-12, provides a means of circulating cavitation fluid throughout the system (e.g., into a cavitation fluid reservoir, into cavitation chamber 101, continuously through cavitation chamber 101, etc.) without exposing the cavitation fluid contained within the system to the ambient atmosphere, other than for unintended exposure due to minor gas leaks within the circulatory system. A pair of conduits 109 and 111, preferably located at the bottom and the top portions, respectively, of chamber 101, and more preferably located at the lowermost portion and the uppermost portions of chamber 101, couple chamber 101 to the circulatory system and allow the chamber to be filled, drained, degassed, replenished during operation (e.g., fuel replenishment), and/or cleaned/degassed during operation (e.g., removal of generated gases or other by-products).

Conduit 111 is coupled to a reservoir 113 by conduit 115. Preferably reservoir 113 is large enough to hold sufficient cavitation fluid to fill chamber 101 and the fluid circulation system. Reservoir 113 is coupled to at least one fluid pump 117 via conduit 119. Pump 117 is coupled to chamber conduit 109 via conduit 121.

Although a separate degassing chamber can be used with the invention, in the preferred embodiment reservoir 113 serves the dual purpose of reservoir and degassing chamber. Degassing the cavitation fluid is critical in order for the collapsing bubbles within cavitation chamber 101 to achieve the desired high velocities, and thus high temperatures, during operation. Accordingly reservoir 113 is coupled to a vacuum pump 123 via a three-way valve 125, valve 125 allowing chamber 113 to be coupled to pump 123 (e.g., for degassing purposes) or open to the atmosphere via conduit 127. By performing the degassing operation while pumping the cavitation fluid through the system, and assuming that pump 123 is coupled to the top of chamber 101 as illustrated to insure that gas is not trapped within the chamber, the entire system can be degassed. Once degassed, the degassing process can be continued while continually pumping the cavitation fluid through the system and operating the cavitation chamber. One benefit of this procedure is the removal of gases generated as a by-product of reactions taking place within chamber 101 (e.g., helium and/or hydrogen that are by-products of many fusion, fission, spallation and neutron stripping reactions). Alternately the degassing procedure can be performed periodically during chamber operation. Alternately after completion of an initial degassing procedure, chamber 101 can be decoupled from the system with a pair of valves 129 and 131 as shown and the degassing procedure discontinued.

As shown and as previously noted, valves 129 and 131 provide a means of isolating cavitation chamber 101 from the circulation system. Chamber isolation can be useful not only during system maintenance, but also during chamber operation. For example, the chamber can be isolated prior to operation thus allowing any heating of the cavitation fluid during operation to cause differential expansion of the fluid as compared to the chamber walls, resulting in an increase in pressure within the chamber and stronger cavitation reactions. Cavitation fluid heating during operation may be due to the cavitation process itself, and/or reactions within the chamber, and/or heat conduction from the drivers.

Figure 3:
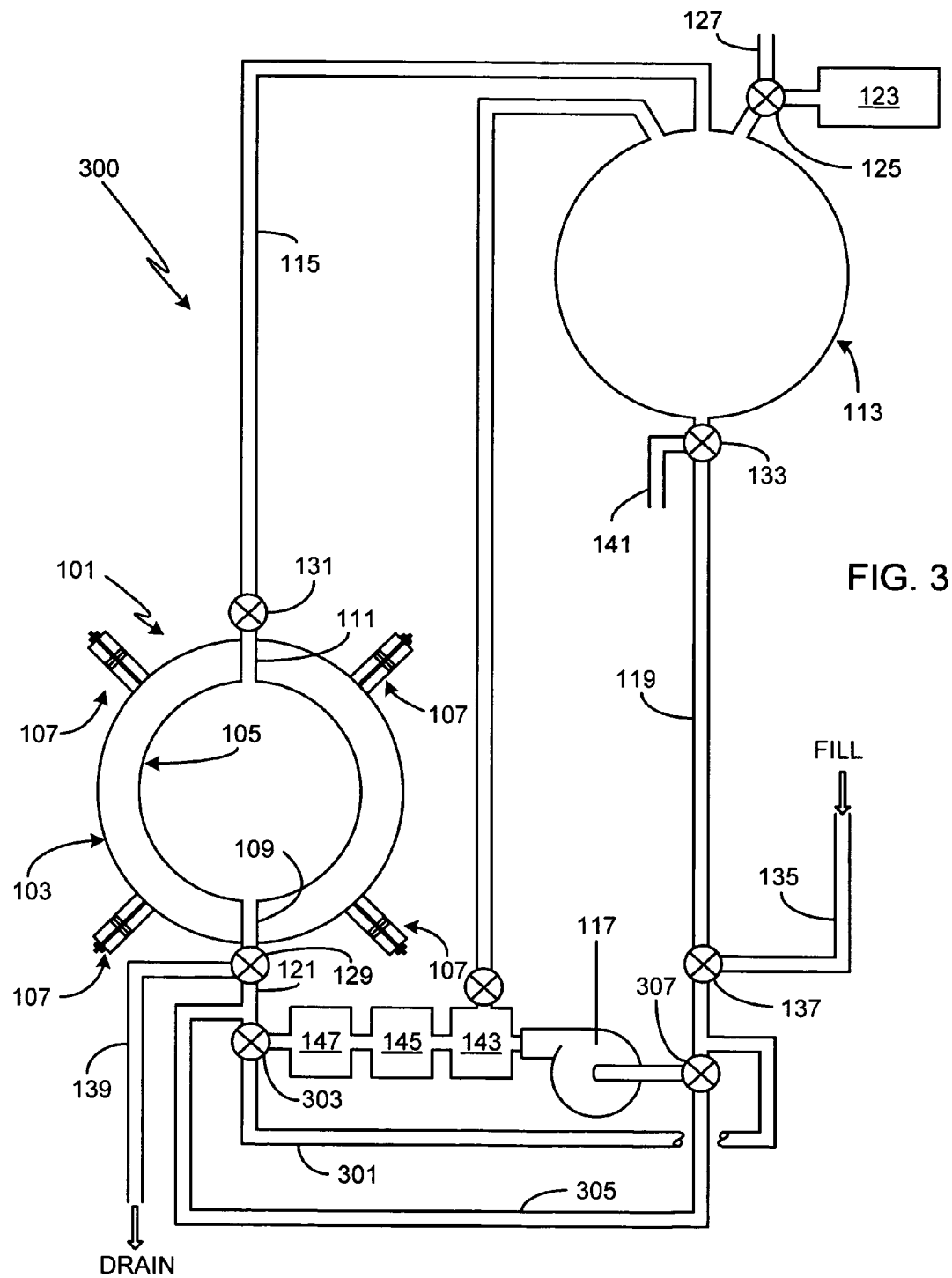
FIG. 3 is an illustration of the primary elements of a preferred embodiment of a cavitation system in accordance with the invention.

FIG. 3 is an illustration of a preferred embodiment of the invention similar to that shown in FIG. 1. In this embodiment, the cavitation fluid circulatory system includes means for both filling and draining chamber 101. In order for the circulatory system to operate as desired, reservoir 113 must be large enough to hold sufficient cavitation fluid to fill chamber 101 and the fluid circulation system. In addition to the conduits shown in the system illustrated in FIG. 1, this embodiment includes a conduit 301 coupled to conduit 119 prior to pump 117 and coupled to the output of pump 117 at a three-way valve 303. Additionally this embodiment includes a conduit 305 coupled to conduit 121 before valve 129 and coupled to the input of pump 117 at a three-way valve 307.

Figure 4:
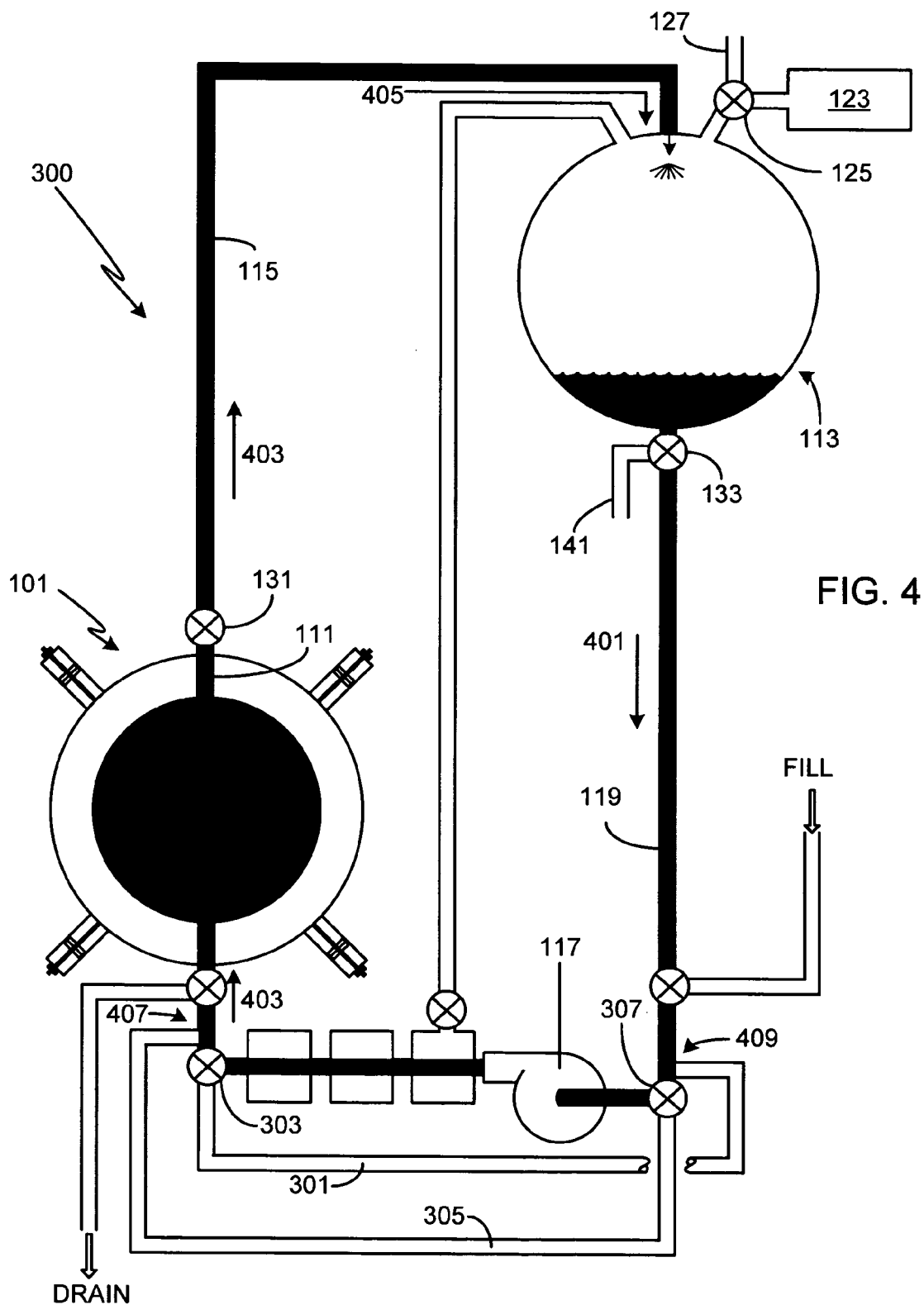
FIG. 4 is an illustration of the cavitation system shown in FIG. 3, with the cavitation fluid circulating through the circulatory system.
Figure 5:
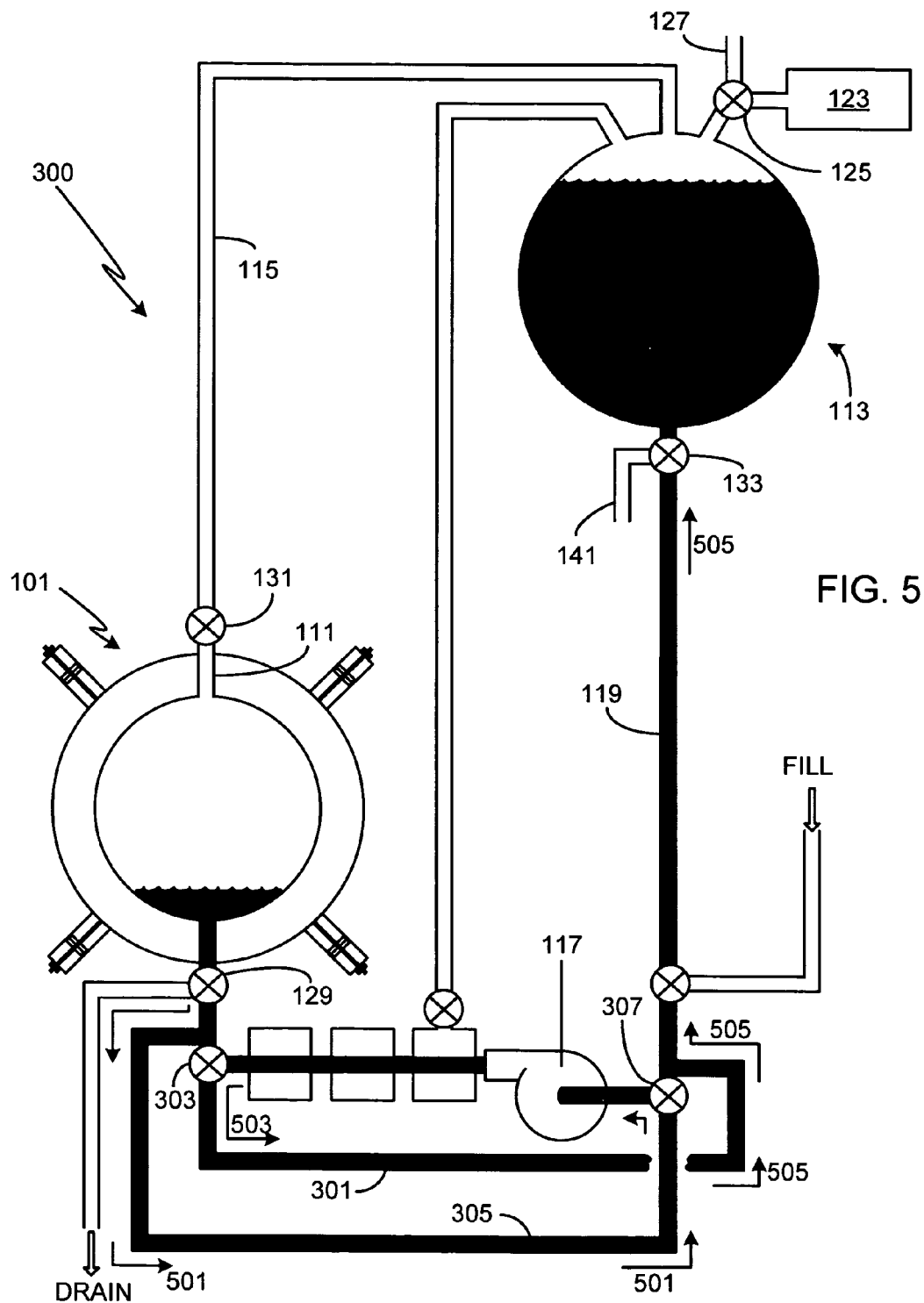
FIG. 5 is an illustration of the cavitation system shown in FIG. 3, with the cavitation fluid being drained from the cavitation chamber into the reservoir.

System 100 provides a straightforward means of either circulating the cavitation fluid, for example during chamber operation, or draining the chamber. For clarity, FIGS. 4 and 5 illustrate these two modes of operation, respectively. One of the primary benefits of this system is that it allows the chamber to be drained without actually draining the circulatory system, thus minimizing fluid loss, exposure to the atmosphere, and possibly contamination, of the cavitation fluid.

In FIG. 4 three-way valves 303 and 307 are set to allow cavitation fluid to be pumped down, and out, of reservoir 113 (direction 401), through pump 117, up through cavitation chamber 101 (direction 403) and back into the reservoir 113 (direction 405). For the sake of clarity, only the portions of the circulation system in which cavitation fluid is actively circulating are highlighted in FIG. 4 even though circulatory conduits 301 and 305 would actually be filled during use (although the fluid within conduits 301 and 305 would not be circulating). If it is undesirable to allow conduits 301 and 305 to be filled during this mode of operation, valves (not shown) can be located at the junctions of these conduits and the primary circulatory conduits (i.e., locations 407 and 409).

In FIG. 5 three-way valves 303 and 307 are switched to reverse the flow of cavitation fluid through the circulatory system. As shown, chamber 101 is still in the process of being pumped out, as evidenced by some cavitation fluid still remaining in the bottom of the chamber 101. As the fluid leaves chamber 101, it flows through conduit 305 (direction 501), through pump 117, through conduit 301 (direction 503) and then up into reservoir 113 (direction 505).

Accordingly, by simply switching two valves (i.e., valves 303 and 307), or four valves if the system also includes valves at locations 407 and 409, the system can alternate between a system that circulates the cavitation fluid through chamber 101 and a system that drains the cavitation fluid from chamber 101, placing the fluid back into reservoir 113. It will be appreciated that although the illustrated embodiment is preferred, primarily due to its simplicity, alternate conduit configurations can be used that also provide a means of draining the cavitation fluid out of the chamber without actually draining the circulatory system. Two such alternate embodiments are illustrated in FIGS. 6-8 and FIGS. 9-11, respectively.

Figure 6:
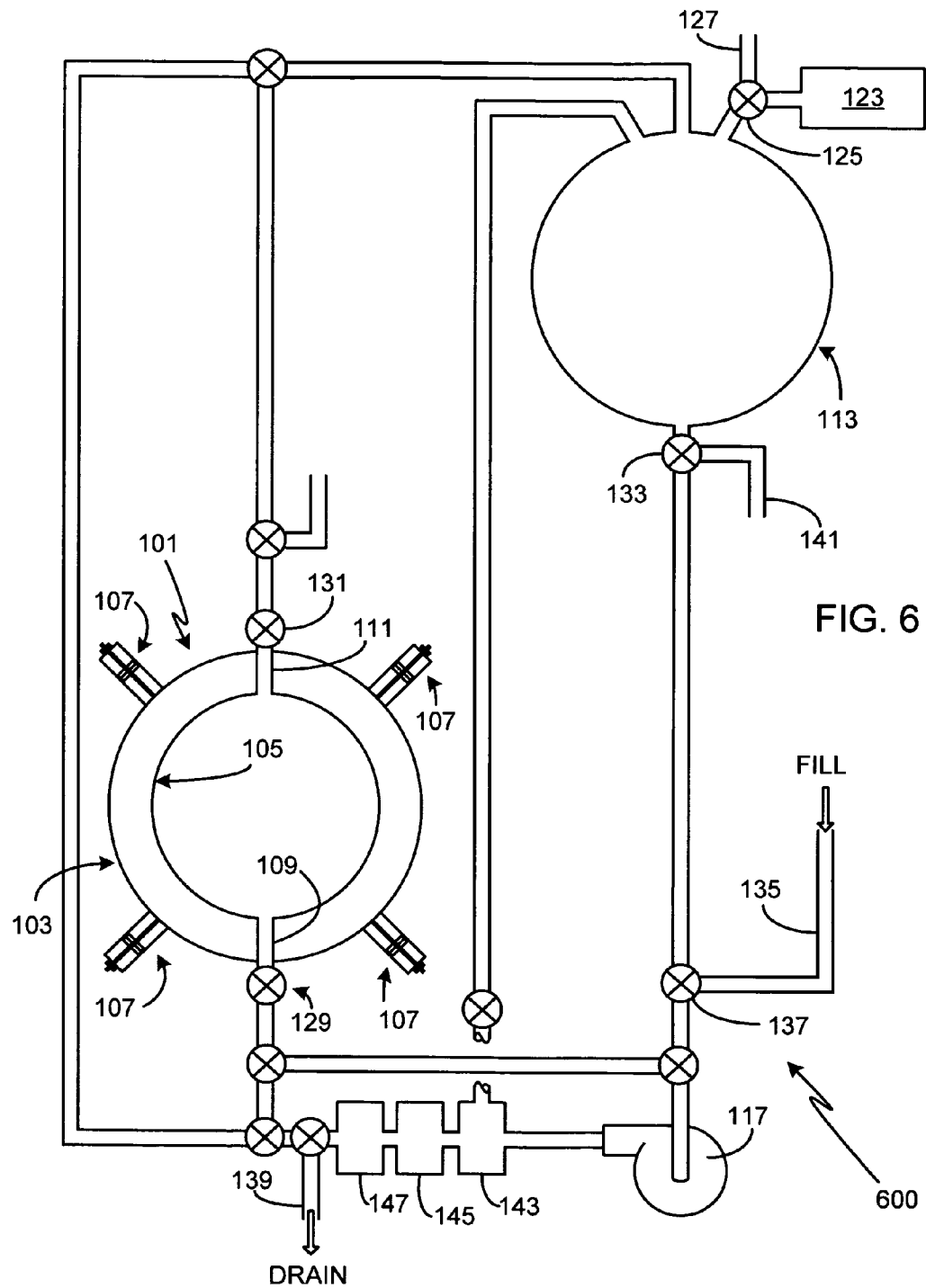
FIG. 6 is an illustration of an alternate embodiment of a cavitation fluid circulatory system.
Figure 7:
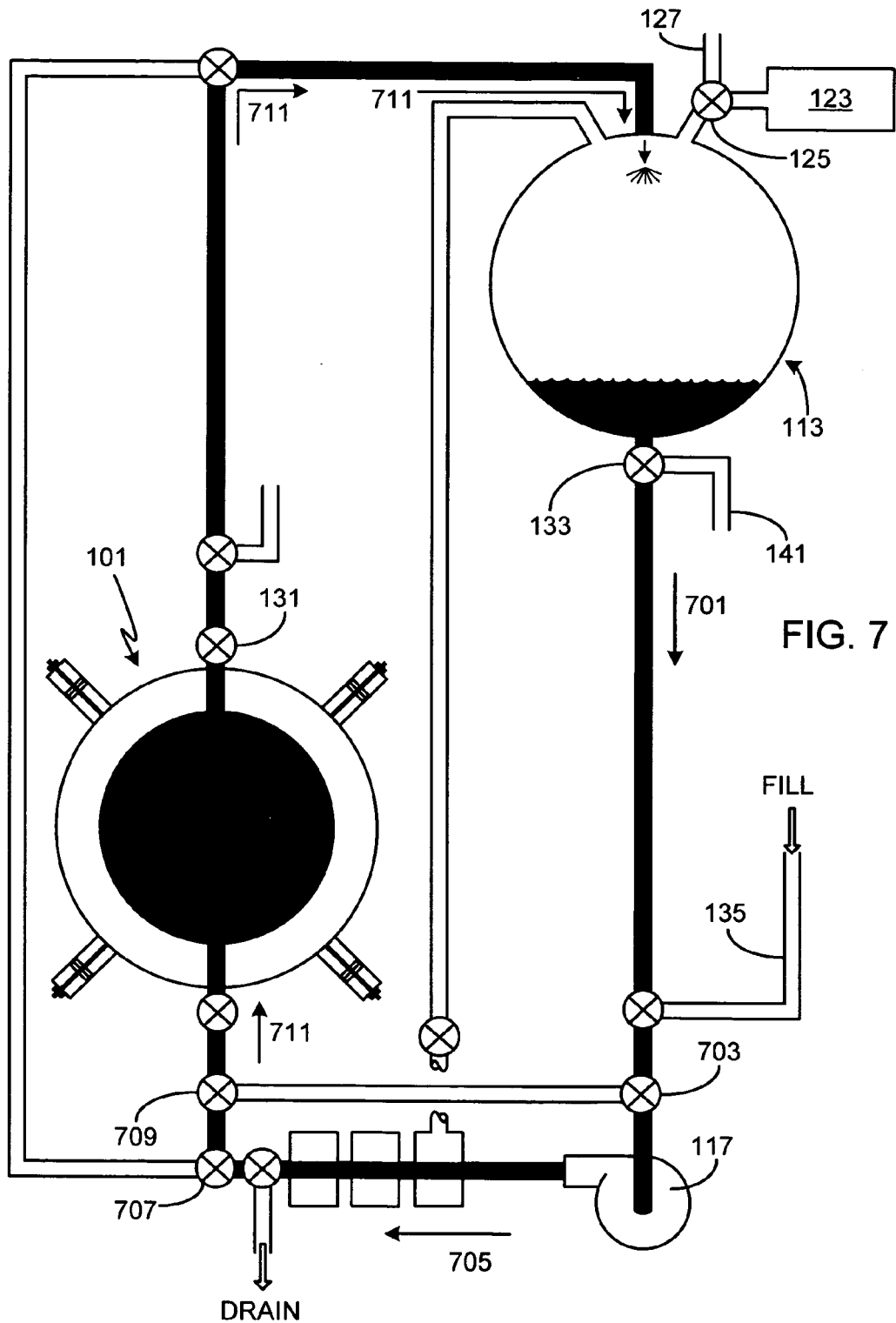
FIG. 7 is an illustration of the cavitation system shown in FIG. 6, with the cavitation fluid circulating through the circulatory system.
Figure 8:
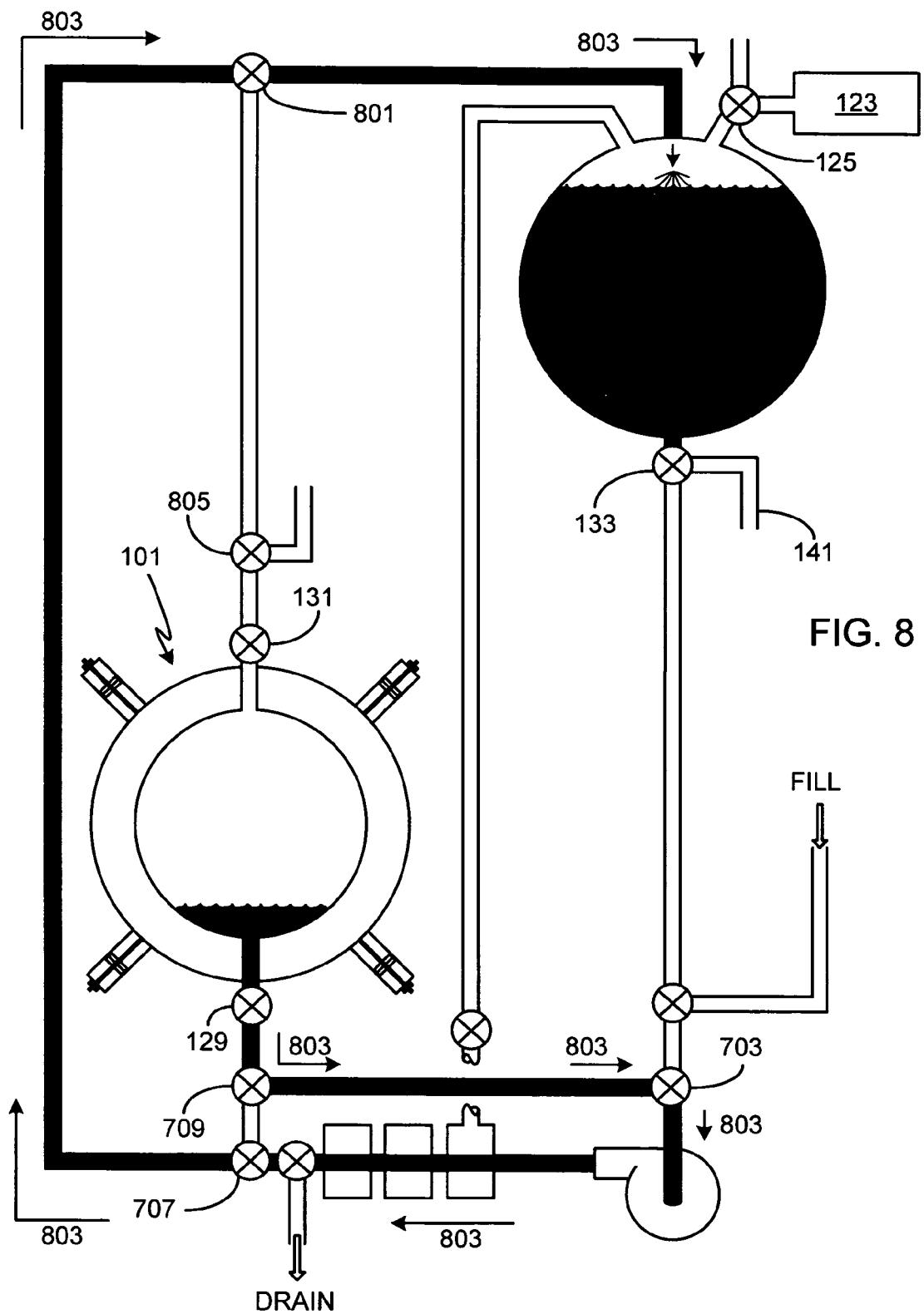
FIG. 8 is an illustration of the cavitation system shown in FIG. 6, with the cavitation fluid being drained from the cavitation chamber into the reservoir.

FIG. 6 is an illustration of an alternate cavitation fluid circulatory/drainage system 600. When circulation of the cavitation fluid is desired as illustrated in FIG. 7, for example prior to or during cavitation chamber operation, valve 133 is opened to allow fluid to pass through reservoir 113 and down in direction 701. Valve 703 is configured in this mode of operation to allow the cavitation fluid to flow into pump 117. Pump 117 pumps the cavitation fluid in direction 705. Valves 707 and 709 are configured in this mode to pass the cavitation fluid through chamber 101 and back to reservoir 113 along direction 711. To use the system to drain chamber 101 as illustrated in FIG. 8, valve 133 is closed and three-way valves 703, 707, 709 and 801 are switched so that the flow of cavitation fluid is along a path 803. If desired, a valve 805 can open the chamber to the atmosphere, thereby accelerating chamber drainage. Unfortunately opening valve 805 also exposes the cavitation fluid to the air which will then dissolve into the fluid.

Figure 9:
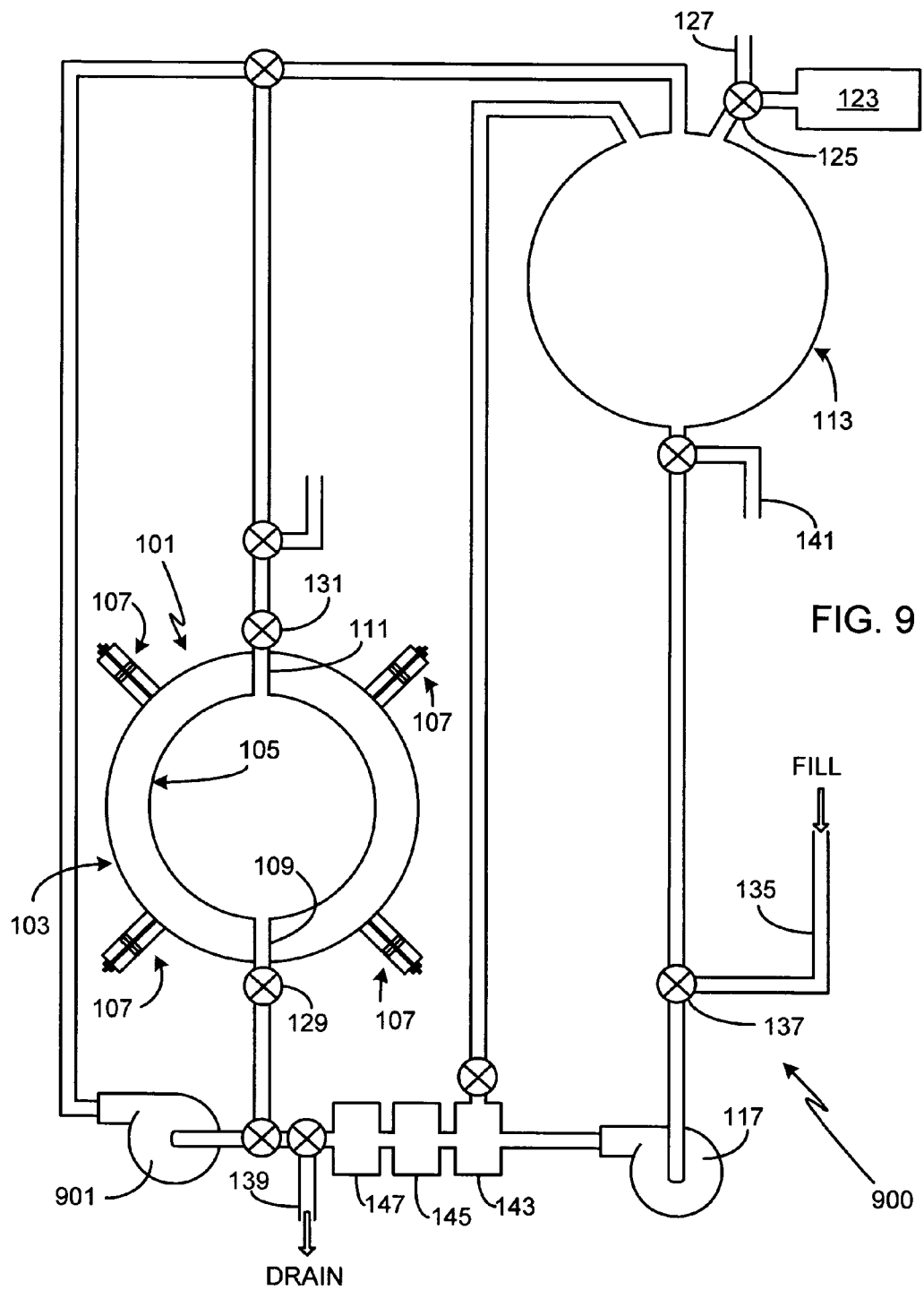
FIG. 9 is an illustration of an alternate embodiment of a cavitation fluid circulatory system.
Figure 11:
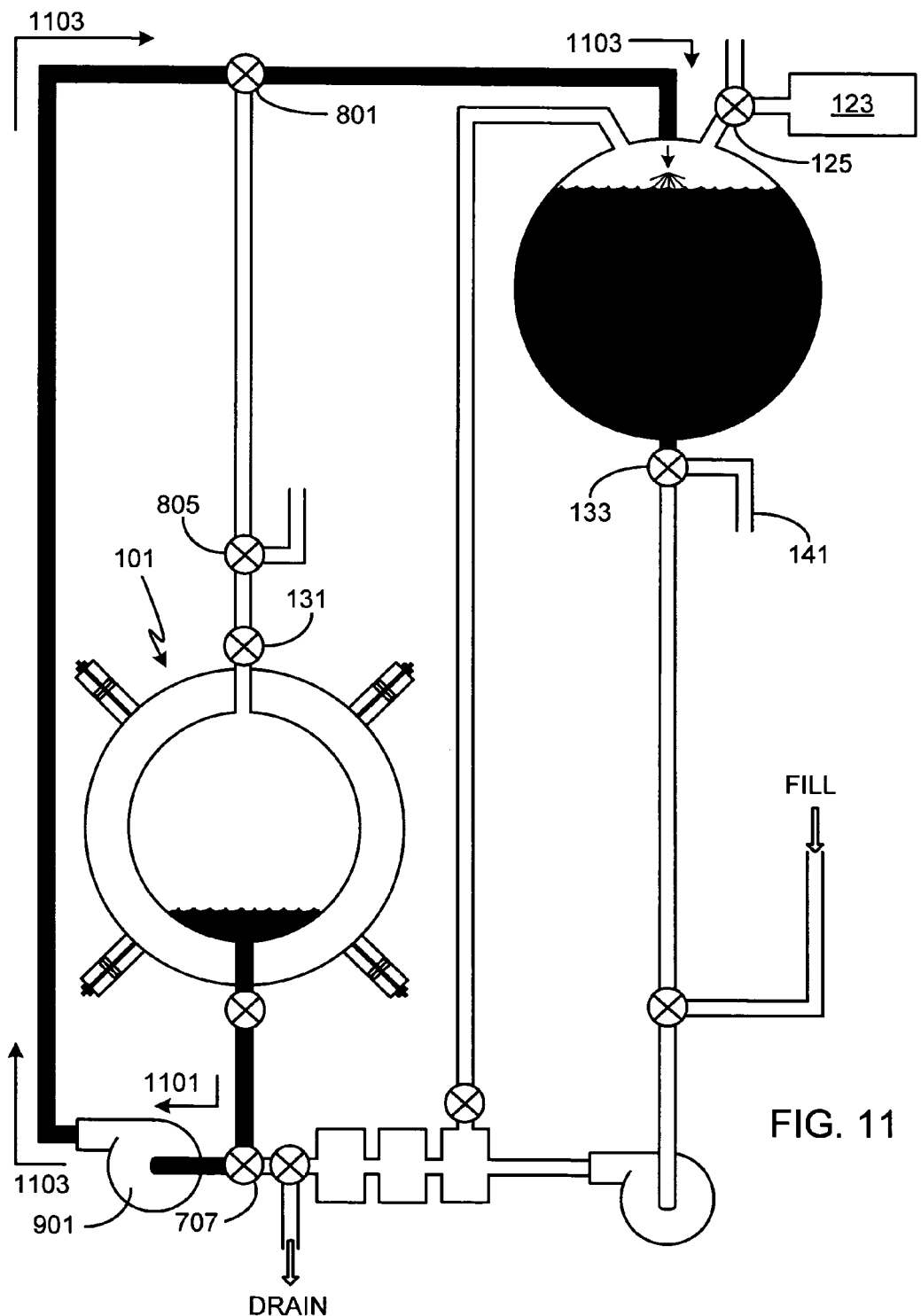
FIG. 11 is an illustration of the cavitation system shown in FIG. 9, with the cavitation fluid being drained from the cavitation chamber into the reservoir.

FIG. 9 is an illustration of an alternate cavitation fluid circulatory/drainage system 900 which includes a second pump 901. To circulate the cavitation fluid through cavitation chamber 101, for example during cavitation chamber operation, valve 133 is opened to allow fluid to pass through reservoir 113 and down in direction 1001. The cavitation fluid is pumped by pump 117 in a direction 1003. Valve 707 is configured in this mode of operation to allow the cavitation fluid to flow up and through chamber 101 (direction 1005) and back into reservoir 113 (direction 1007). During chamber drainage as illustrated in FIG. 11, valve 133 is closed and three-way valves 707 and 801 are switched so that the cavitation fluid flows out of chamber 101 along path 1101 to pump 901. Pump 901 pumps the fluid along path 1103 back to reservoir 113. As previously noted, a valve 805 can be opened to accelerate chamber drainage.

Regardless of the circulatory system utilized, the first step is to fill the system with cavitation fluid. The cavitation fluid can be added directly to reservoir 113 through conduit 127. Alternately a separate fill tube (not shown) can be added to reservoir 113. Alternately a fill tube 135 can be coupled to the circulatory system via a valve 137, preferably at a location immediately prior to pump 117. In addition to filling the circulatory system prior to operation, the fill tube(s) can be used to replenish the fuel or other reactants contained within the cavitation fluid during operation. Any of the disclosed circulatory systems can also utilize an additional chamber 1201 for either adding more cavitation fluid or replenishing the fuel or other reactants (illustrated in FIG. 12). In the illustrated embodiment, pumps 117 and 1203 are positive displacement pumps and the material 1205 to be added (e.g., fuel) is preferably pressurized prior to entering chamber 1201 in order to accelerate the materials absorption into the cavitation fluid.

As previously noted, the circulatory system of the invention allows the cavitation fluid to be removed from cavitation chamber 101 without draining the circulatory system, thus minimizing potential cavitation fluid waste and/or potential cavitation fluid contamination by air or other contaminants. However as the circulatory system may be occasionally drained, for example for system maintenance or cavitation fluid replacement, the system includes one or more drainage ports. In the illustrated embodiments, a drainage port 139 is attached to the lowermost chamber conduit, thus providing one means of draining chamber 101. Alternately, or in addition to port 139, a drainage port 141 can be coupled to the circulatory system, for example directly below reservoir 113 as shown. Typically drain port 139 is preferred as pump 117 can then be used to pump the fluid out of the system. For example, in the embodiment illustrated in FIGS. 3-5, the cavitation fluid would first be pumped into reservoir 113 as described above relative to FIG. 5. Once the chamber has been drained, the circulatory system would be drained by switching valves 303 and 307 (as shown in FIG. 4) plus three-way valve 129, thus pumping the fluid out of reservoir 113 and out drain 139. Although not preferred, the system can also be pumped out by draining the chamber as shown in FIG. 5, but with valve 133 open to drain 141.

Figure 13:
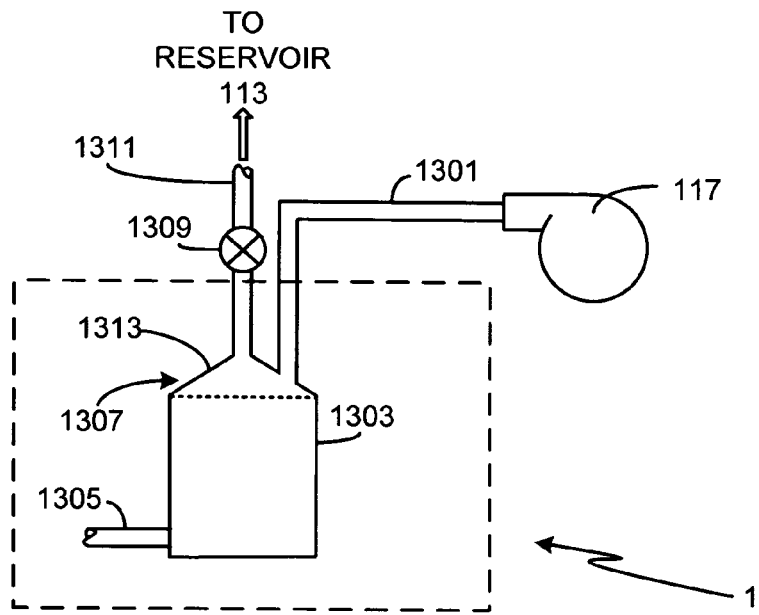
FIG. 13 is an illustration of a bubble trap.

In order to minimize all undesired gas within the cavitation fluid, preferably a bubble trap 143 immediately follows the outlet of pump 117 as shown in the illustrated embodiments, thus helping to eliminate any bubbles generated by the pump itself. FIG. 13 provides an exploded view of one embodiment of bubble trap 143. As shown, the outlet 1301 of pump 117 enters the top of a trap container 1303. Although outlet 1301 can enter container 1303 at other locations, the inventors have found that by entering the top of container 1303, bubbles are more likely to be removed by trap 143 and less likely to continue on through the circulatory system. The cavitation fluid passes through container 1303, exiting through outlet 1305. Trapped bubbles float to the top portion 1307 of container 1303 where they are periodically removed via valve 1309 and conduit 1311, conduit 1311 being coupled to reservoir 113 and thus indirectly coupled to vacuum pump 123. Preferably the top surface 1313 of container 1303 is conically-shaped with conduit 1311 coupled to the uppermost portion of surface 1313, the shape of surface 1313 helping to guide the bubbles to conduit 1311, thereby minimizing the risk of bubbles being trapped within container 1303 where they could dissolve back into the liquid.

In the preferred embodiments of the invention, the circulatory system includes a filter 145 which removes contaminants from the cavitation fluid, thus preventing the contaminants from potentially disrupting the cavitation process. The contaminants may be native to the cavitation fluid. Alternately, or in addition to native contaminants, the contaminants to be removed may be a product of the cavitation process itself, for example resulting from the flow of the cavitation fluid through the heat exchange system or from the effects of the cavitation process on the internal surfaces of the cavitation chamber. Alternately, or in addition to the above-described contaminants, the contaminants may be a by-product of a reaction taking place within the cavitation chamber. It will be appreciated that the exact nature of filter 145 depends upon the type of cavitation fluid as well as the type of contamination, i.e., impurity, to be removed from the cavitation fluid. As filters are well know, further description is not provided herein.

In at least one of the preferred embodiments, a heat exchange system 147 is coupled to a conduit of the circulatory system, thus allowing the temperature of the cavitation fluid to be controlled. The cavitation fluid can either be continually pumped through heat exchange system 147, i.e., during chamber operation, or used to alter the temperature of the fluid prior to chamber operation. Furthermore heat exchange system 147 can be used to cool the cavitation fluid below ambient temperature, to cool the cavitation fluid by removing excess heat from the cavitation chamber, or to heat the cavitation fluid to a desired temperature.

In a preferred embodiment heat exchange system 147 is used to cool the cavitation fluid below ambient temperature, thus lowering the vapor pressure of the fluid and allowing higher velocities to be achieved by the collapsing bubbles within the chamber. As a result, the cavitating bubbles generate higher temperatures at collapse stagnation. Although in this embodiment heat exchange system 147 is typically located after pump 117 and as close to cavitation chamber 101 as reasonable, thus minimizing the introduction of heat into the cooled cavitation medium from pump 117, the surroundings, etc., it will be appreciated that the location of system 147 relative to pump 117 depends on the ambient temperature, the temperature to which the cavitation fluid is to be maintained, and the preferred operating temperature of the pump.

In another embodiment heat exchange system 147 cools the cavitation fluid by withdrawing excess heat generated within the chamber. The excess heat can be a product of the cavitation process itself as the cavitating bubbles generate heat within the fluid, for example due to viscous effects. The excess heat can also be the product of reactions taking place within the chamber which are promoted by the cavitation process. Such reactions include both chemical reactions and nuclear reactions. The excess heat can also be the result of heat conducted into the cavitation medium from drivers 107 as these drivers may be driven at very high levels (e.g., hundreds of watts of input power). In embodiments in which the cavitation fluid is a hot liquid such as a molten metal or salt, heat exchange system 147 is preferably located before pump 117 rather than after pump 117 as shown in the illustrations. Such a mounting location is preferred as it cools the cavitation fluid before introducing it into pump 117, thus minimizing the pump operating temperature for such applications. It will be appreciated that whether heat exchange system 147 is located before or after pump 117 depends upon the temperatures of the cavitation fluid before and after heat exchange system 147, the ambient temperature and the preferred operating temperatures of pump 117 and the cavitation fluid.

In another embodiment heat exchange system 147 is used to heat the cavitation fluid to the desired operational temperature. Such heating is useful, for example, to promote specific reactions (e.g., chemical reactions) within the cavitation fluid or to maintain the cavitating medium in the fluid phase (i.e., heating to above the melting temperature of the medium). Preferably heat exchange system 147 is positioned relative to pump 117 as shown, thus allowing pump 117 to pump a relatively cool fluid. As previously noted, the location of heat exchange system 147 relative to pump 117 depends upon the temperatures of the cavitation fluid before and after heat exchange system 147, ambient temperature and the preferred operating temperatures of pump 117 and the cavitation fluid.

Figure 14:
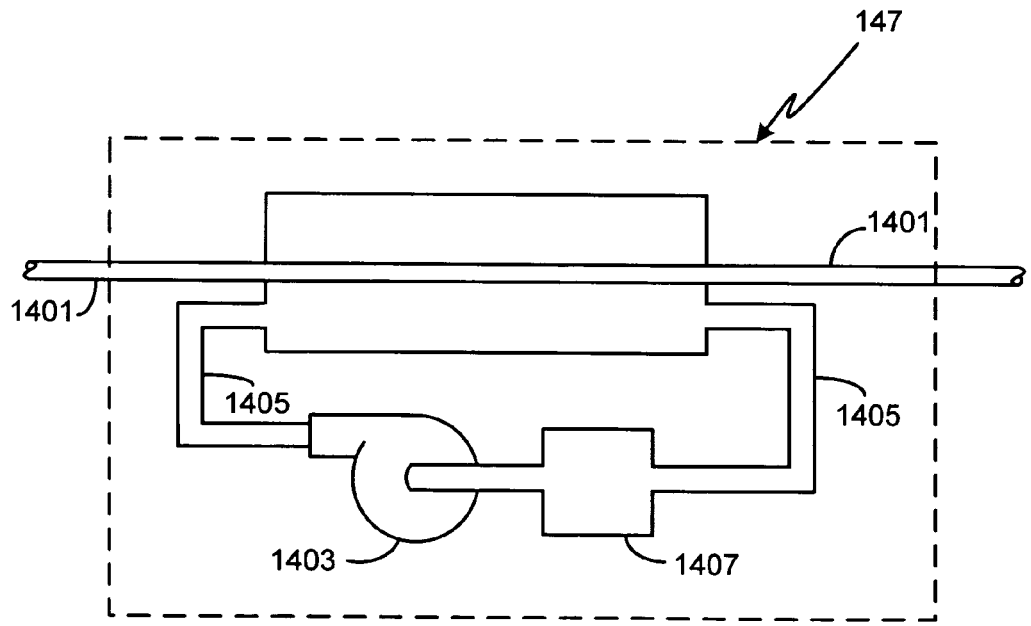
FIG. 14 is an illustration of a heat exchanger in which the heat exchange fluid is in direct contact with a conduit carrying the cavitation fluid.
Figure 15:
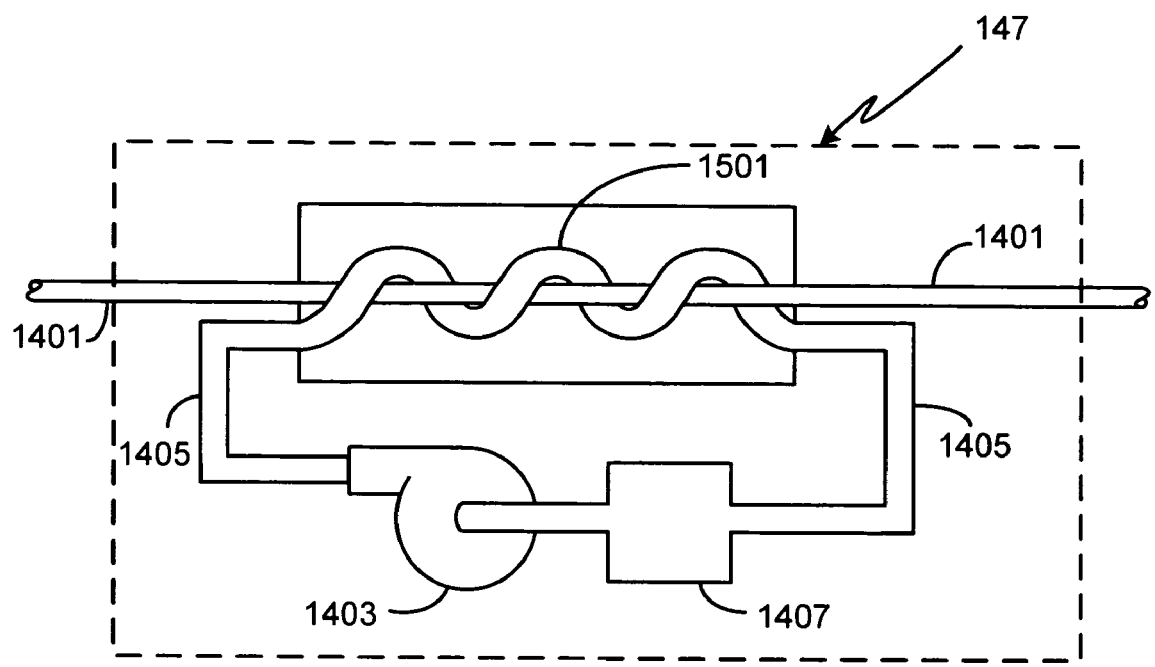
FIG. 15 is an illustration of another embodiment of a heat exchanger in which the heat exchange fluid is pumped through a conduit maintained in close proximity to a portion of the conduit carrying the cavitation fluid.

Heat exchangers are well known by those of skill in the art, and therefore detailed descriptions of possible means of implementing heat exchange system 147 are not provided herein. In general, heat is conducted into or out of a circulatory conduit by placing a portion of the conduit in thermal contact, direct or indirect, with (i) a heated fluid, (ii) a cooled fluid, (iii) a thermoelectric cooler, (iv) a heat sink, (v) a refrigeration system or (v) a heating system. Heat exchange system 147 can also use a combination of heaters/coolers to provide complete temperature regulation of the cavitation fluid. Assuming that heat exchange system 147 uses a temperature regulated fluid, either heated or cooled, the fluid can either be in direct contact with the circulatory conduit 1401 as illustrated in FIG. 14, or contained within a separate conduit 1501 as illustrated in FIG. 15. Preferably if a heat exchange fluid is used, the heat exchange fluid is pumped with a pump 1403 through a conduit 1405 to an appropriate heater or cooler 1407. The location of the heater or cooler relative to pump 1403 typically depends on whether heat is being added (e.g., use of a heater) or withdrawn (e.g., use of a cooler) as pump 1403 generally operates best if the temperature of the heat exchange fluid is relatively cool. Accordingly if the system uses a cooler to lower the temperature of the heat exchange fluid temperature after it has been heated by conduit 1401, typically the cooler is located before the intake of pump 1403 as shown in FIGS. 14 and 15. If a heater is being used to heat the heat exchange fluid prior to passing through heat exchange system 147, typically the heater is located between the output of pump 1403 and heat exchange system 147 (not shown). It will be appreciated that the location of the heater or cooler depends on the temperatures of the fluid, both before and after being thermally conditioned, and it will also be appreciated that the general rules noted above may not be followed, depending upon the preferred operating conditions of pump 1501 and the specific temperatures involved. Any of a variety of well known techniques can be used in the heater/cooler 1407 (e.g., gas heaters, refrigeration units, etc.).

If sufficient heat is withdrawn from the cavitating liquid by heat exchange system 147, the excess heat can be used to drive any of a variety of thermally powered systems such as heaters, thermoelectric generators and steam turbines (not shown), thus producing electricity that can be used for a variety of applications, including reduction of the electrical demands of the cavitation system itself. Preferably such thermally powered systems are sufficiently efficient to eliminate the need for cooler 1407. If desired, however, cooler 1407 can be used to further lower the temperature of the heat exchange fluid.

Figure 10:
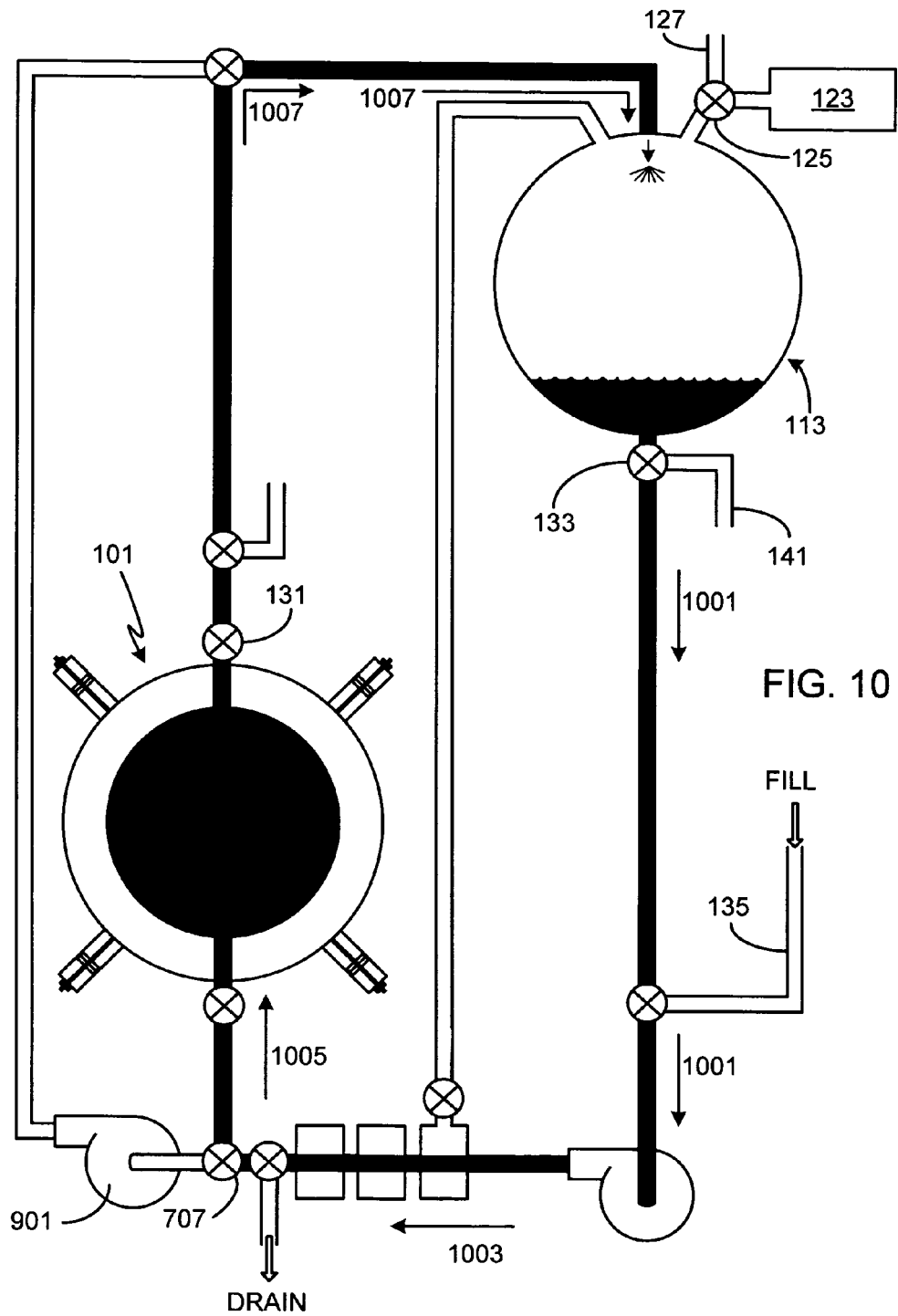
FIG. 10 is an illustration of the cavitation system shown in FIG. 9, with the cavitation fluid circulating through the circulatory system.
Figure 12:
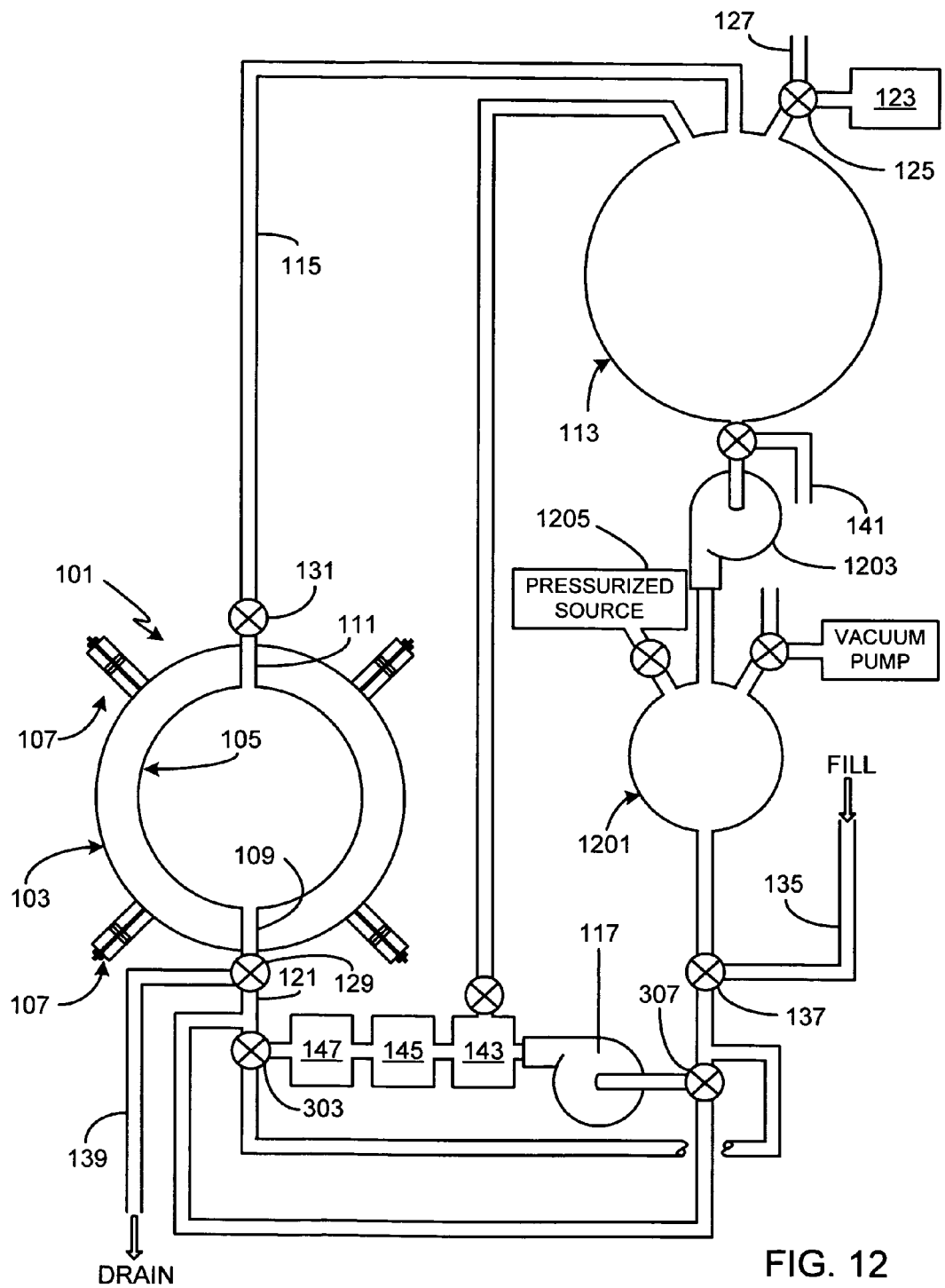
FIG. 12 is an illustration of a cavitation system similar to that shown in FIG. 3, with the addition of a pressurized fuel source.

Regardless of the exact nature of the circulatory system, i.e., whether the system is configured as shown, or similar to, the configuration of FIG. 1, or the configuration of FIGS. 3-5, or the configuration of FIGS. 6-8, or the configuration of FIGS. 9-11, or the configuration of FIG. 12, or an alternate configuration, preferably preparation of the cavitation fluid for chamber operation utilizes a degassing procedure as described relative to FIG. 16, or FIG. 17, or FIG. 18, or FIG. 19.

Figure 16:
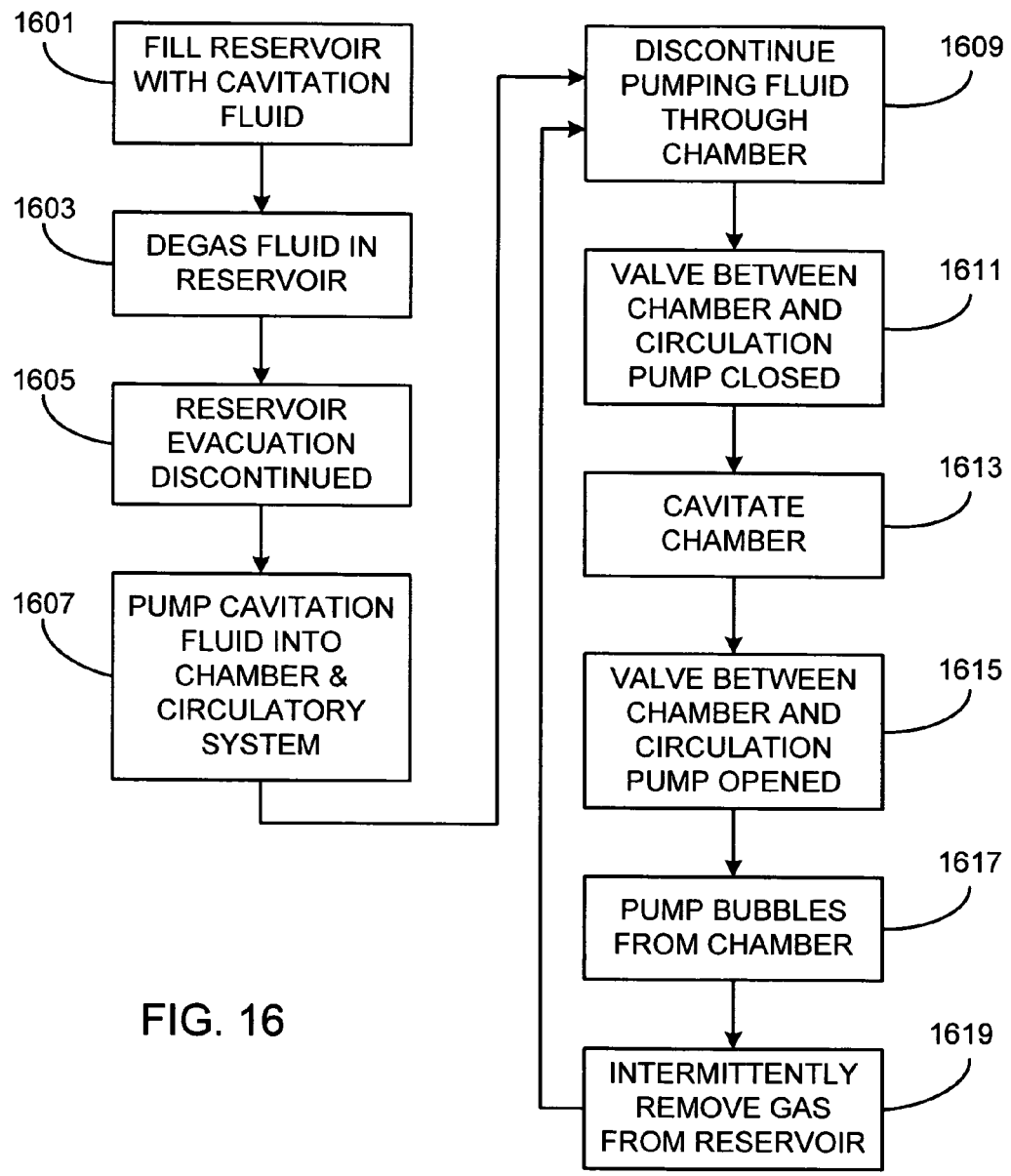
FIG. 16 illustrates the preferred degassing procedure.

The first step in the degassing method illustrated in FIG. 16 is to fill reservoir 113 with cavitation fluid (step 1601). If the fluid is already within the circulatory system, the fluid is pumped back into reservoir 113 as previously described. The fluid within reservoir 113 is then degassed using vacuum pump 123 (step 1603). The amount of time required during this step depends on the volume of cavitation chamber 101, the volume of cavitation fluid to be degassed and the capabilities of the vacuum system. Preferably vacuum pump 123 evacuates reservoir 113 until the pressure within the reservoir is close to the vapor pressure of the cavitation fluid (e.g., to a pressure of within 2 psi of the vapor pressure of the cavitation fluid, alternately to a pressure of within 0.2 psi of the vapor pressure of the cavitation fluid, alternately to a pressure of within 0.02 psi of the vapor pressure of the cavitation fluid, etc.). Typically step 1603 is performed for at least 1 hour, preferably for at least 2 hours, more preferably for at least 4 hours, and still more preferably until the reservoir pressure is close to the vapor pressure of the cavitation fluid as previously noted.

Once the fluid within reservoir 113 is sufficiently degassed, pump 117 circulates the cavitation fluid through the circulatory system and into cavitation chamber 101 (step 1607), for example as previously described relative to FIGS. 4, 7 and 10. Preferably prior to this step evacuation of reservoir 113 using vacuum pump 123 is temporarily discontinued (step 1605). After the cavitation chamber is filled, pumping of the cavitation fluid through the cavitation chamber is discontinued (step 1609). Although not required, preferably during this step valve 129 is closed (step 1611). Next the fluid within the cavitation chamber is cavitated for a period of time (step 1613), typically for at least 5 minutes and preferably for more than 30 minutes. During step 1613 the cavitation process tears vacuum cavities within the cavitation fluid. As the newly formed cavities expand, gas from the fluid enters into the cavities. During cavity collapse, however, not all of the gas re-enters the fluid. Accordingly a result of the cavitation process is the removal of dissolved gas from the cavitation fluid and the generation of bubbles. The bubbles, due to their buoyancy, float to the top of chamber 101. The bubbles are then pumped from the chamber by pumping a sufficient amount of cavitation fluid through the system to cause the bubbles at the top of the chamber to pass out of the chamber and into conduit 115 (step 1617). If previously closed, valve 129 must be opened (step 1615) prior to performing step 1617. Gradually the bubbles pumped out of the chamber enter reservoir 113, the speed by which they enter reservoir 113 dependent upon the amount of fluid pumped out of the cavitation chamber during step 1617, the volume of the conduit between the chamber and the reservoir, and the number of times these steps have been performed. The gas removed from the fluid within the chamber and passed into reservoir 113 is removed, as desired, using vacuum pump 123 (step 1619). Typically step 1619 is only performed after there has been a noticeable increase in pressure within reservoir 113, preferably an increase of at least 2 psi over the vapor pressure of the cavitation fluid, alternately an increase of at least 0.2 psi over the vapor pressure of the cavitation fluid, or alternately an increase of at least 0.02 psi over the vapor pressure of the cavitation fluid. During steps 1615, 1617 and 1619 the cavitation process may or may not be discontinued. Preferably steps 1609, 1611, 1613, 1615, 1617 and 1619, or alternately steps 1609, 1613, 1617 and 1619, are repeated until the amount of dissolved gas within the cavitation fluid inside the cavitation chamber is so low that the fluid will no longer cavitate at the same cavitation driver power. Typically these steps are performed for at least 12 hours, preferably for at least 24 hours, more preferably for at least 36 hours, and still more preferably for at least 48 hours. For example, the inventors found that these steps needed to be repeated for between 24 and 48 hours for a 9.5 inch ID chamber.

Figure 17:
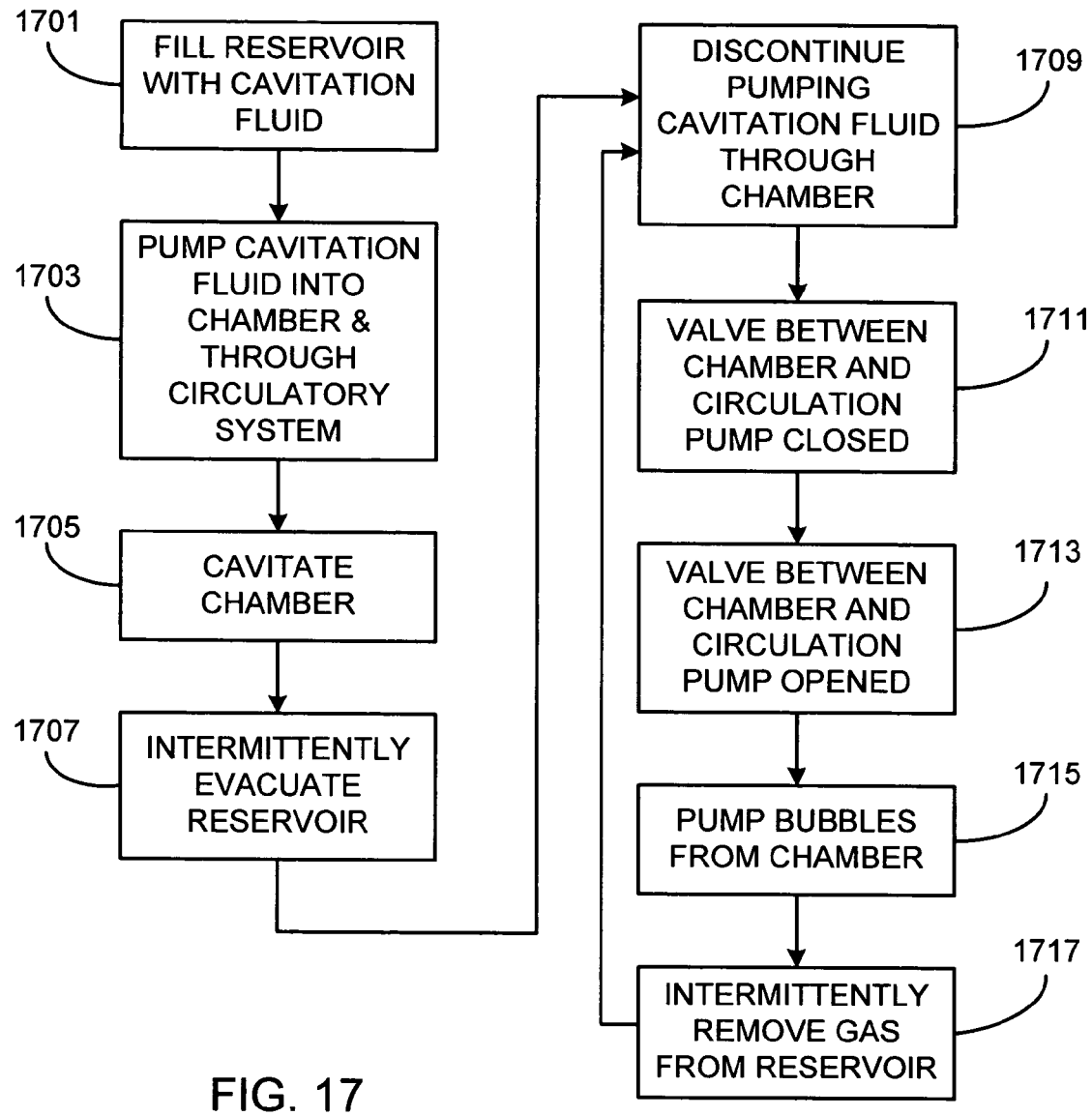
FIG. 17 illustrates an alternate preferred degassing procedure.

FIG. 17 illustrates the preferred degassing procedure which is a slight modification of the degassing procedure shown in FIG. 16. In this embodiment and during the initial stage of degassing, after reservoir 113 is filled with cavitation fluid (step 1701) the fluid is continuously circulated through cavitation chamber 101 and the circulatory system (step 1703). Next cavitation is initiated in chamber 101 (step 1705) while the cavitation fluid continues to be pumped through the chamber and the circulatory system. In order to remove the gas from the chamber and circulatory system, reservoir 113 is intermittently evacuated using vacuum pump 123 (step 1707). It will be appreciated that the frequency and duration of evacuation step 1707 depends on the amount of gas in the system as well as the size of the chamber, the amount of cavitation fluid, the capabilities of the vacuum pump, etc. Typically evacuation step 1707 is performed for longer periods of time and more frequently during the initial stages of degassing when the system contains more gas, and then less frequently and for shorter periods of time as the system becomes degassed. Rather than relying strictly on a schedule to determine when and for how long to evacuate reservoir 113, the inventors have found that the pressure within reservoir 113 can be monitored. Preferably evacuation of reservoir 113 continues until the pressure is reduced to a predetermined level, for example to a pressure close to the vapor pressure of the cavitation fluid (e.g., to a pressure of within 2 psi of the vapor pressure of the cavitation fluid, alternately to a pressure of within 0.2 psi of the vapor pressure of the cavitation fluid, alternately to a pressure of within 0.02 psi of the vapor pressure of the cavitation fluid, etc.), at which point the evacuation process can be discontinued until either the pressure within the reservoir again increases to a preset level (e.g., preferably an increase of at least 2 psi over the vapor pressure of the cavitation fluid, alternately an increase of at least 0.2 psi over the vapor pressure of the cavitation fluid, or alternately an increase of at least 0.02 psi over the vapor pressure of the cavitation fluid, etc.) or until it is determined that the system is sufficiently degassed to allow either the desired cavitation procedures or the next stage of degassing to be performed. Preferably this stage of the procedure (i.e., steps 1705 and 1707) is performed for at least 12 hours although greater periods of time (i.e., greater than 24 hours, greater than 48 hours, etc.) may be required depending upon the fluid, system size and vacuum constraints.

In order to improve on the level of system degassing, the inventors have found that the above procedure can be further improved by performing a second stage of degassing. Typically the second stage of degassing is initiated either after a preset time period (e.g., preferably after 6 hours, more preferably after 12 hours) or after the pressure within reservoir 113 remains at the vapor pressure of the cavitation fluid for at least 10 minutes, and preferably for at least 30 minutes, and more preferably for at least 1 hour, after the evacuation process is discontinued. During the second stage of degassing, pumping of the cavitation fluid through the cavitation chamber is temporarily discontinued (step 1709). Preferably during this step valve 129 is closed (step 1711). After chamber cavitation has removed sufficient dissolved gas from the cavitation fluid (e.g., typically after at least 5 minutes), valve 129 is opened (step 1713) if it was previously closed, and sufficient cavitation fluid is pumped through the system to cause the bubbles at the top of the chamber to pass out of the chamber and into conduit 115 (step 1715). Gradually the bubbles pumped out of the chamber enter reservoir 113, the speed at which they enter reservoir 113 dependent upon the amount of fluid pumped out of the cavitation chamber during step 1715, the volume of the conduit between the chamber and the reservoir, and the number of times these steps have been performed. The gas removed from the fluid within the chamber and passed into reservoir 113 is removed, as desired, using vacuum pump 123 (step 1717). Typically step 1717 is only performed after there has been a noticeable increase in pressure within reservoir 113, preferably an increase of at least 2 psi over the vapor pressure of the cavitation fluid, alternately an increase of at least 0.2 psi over the vapor pressure of the cavitation fluid, or alternately an increase of at least 0.02 psi over the vapor pressure of the cavitation fluid. Although not required, preferably the cavitation process continues throughout the process. Preferably steps 1709, 1711, 1713, 1715 and 1717, or alternately steps 1709, 1715 and 1717, are repeated until the amount of dissolved gas within the cavitation fluid is so low that the fluid within the cavitation chamber will no longer cavitate at the same cavitation driver power. Typically these steps are performed for at least 12 hours, preferably for at least 24 hours, more preferably for at least 36 hours, and still more preferably for at least 48 hours.

Figure 18:
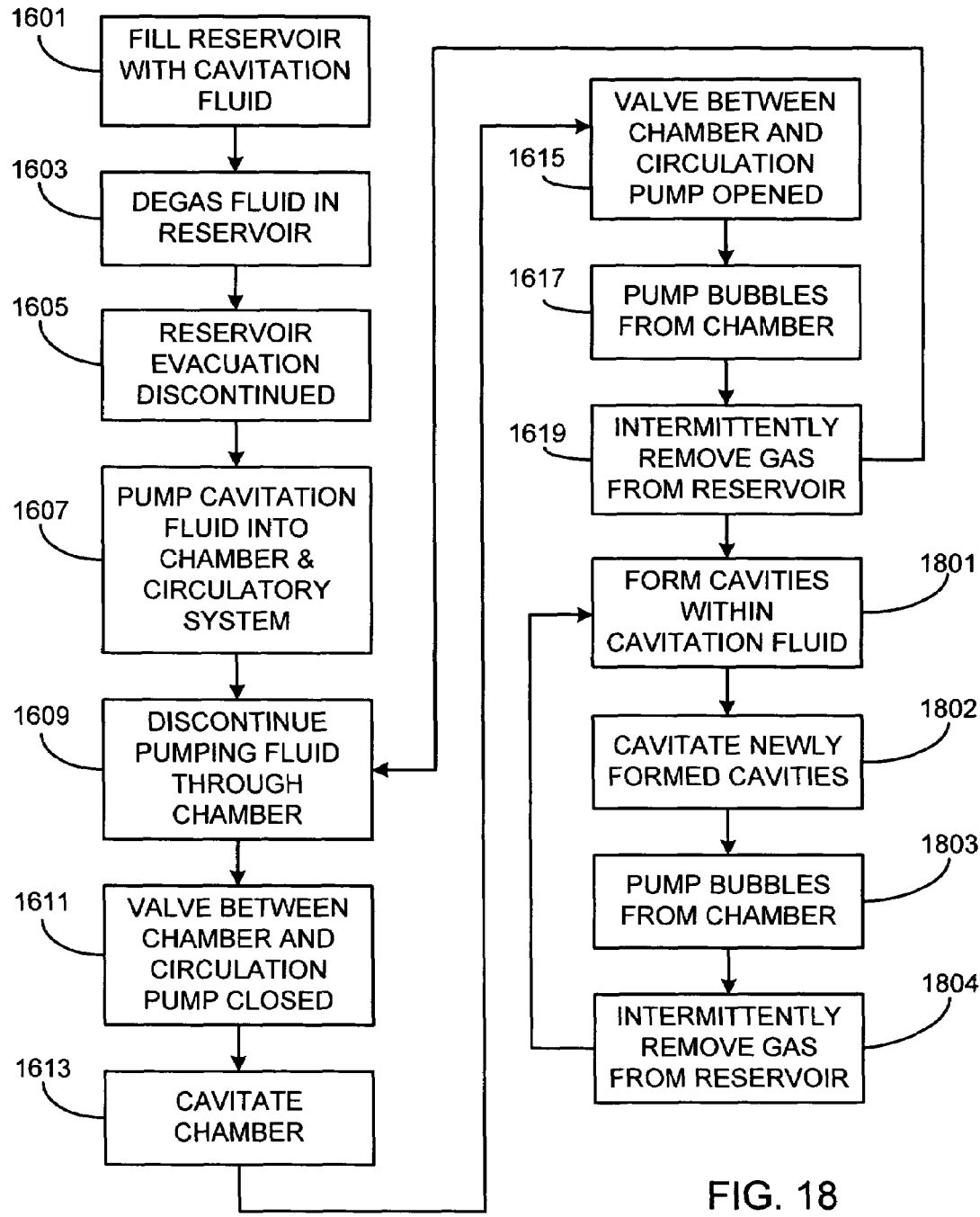
FIG. 18 illustrates a preferred degassing procedure based on the procedure shown in FIG. 16.
Figure 19:
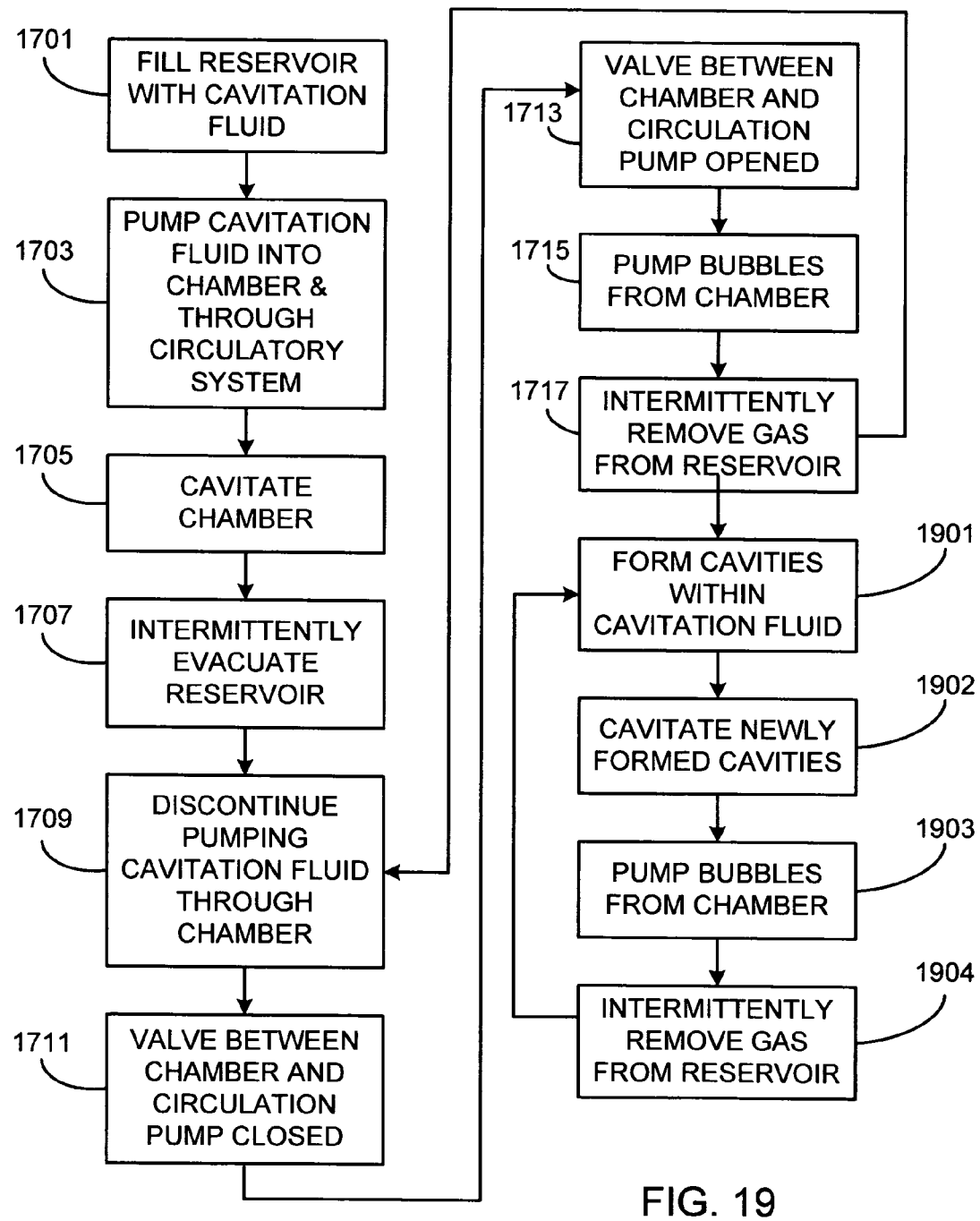
FIG. 19 illustrates a preferred degassing procedure based on the procedure shown in FIG. 17.

Although at the conclusion of either of the procedures outlined above the cavitation fluid may be sufficiently degassed for many purposes, the inventors have found that further degassing is preferred. FIG. 18 corresponds to FIG. 16 with the addition of further degassing steps 1801-1804. Similarly FIG. 19 corresponds to FIG. 17 with the addition of further degassing steps 1901-1904. As previously noted, after the conclusion of the procedures corresponding to FIGS. 16 and 17, further cavitation is not possible without increasing the input power to the drivers. Accordingly the first step (i.e., step 1801 or step 1901) in the further degassing procedures is to form cavities within the cavitation fluid contained in the cavitation chamber. These cavities can be formed using any of a variety of means, including neutron bombardment, focusing a laser beam into the cavitation fluid to vaporize small amounts of fluid, by locally heating small regions with a hot wire, or by other means. Once one or more cavities are formed within the cavitation fluid, the cavitation drivers cause the cavitation of the newly formed cavities (i.e., step 1802 or step 1902). As a result, gas dissolved within the fluid is removed and bubbles are formed within the chamber. Pump 117 is used to pump a sufficient amount of cavitation fluid through the system to cause the bubbles at the top of the chamber to pass out of the chamber and into conduit 115 (i.e., step 1803 or step 1903). During this pumping sequence valve 129 must be opened, if previously closed. As the process is repeated, the bubbles gradually pass through conduit 115 and into reservoir 113 where the gas can be removed, when desired, through use of vacuum pump 123 (i.e., step 1804 or step 1904). This stage of degassing can continue for either a preset time period (e.g., greater than 6 hours and preferably greater than 12 hours), or until the amount of dissolved gas being removed is negligible as evidenced by the pressure within reservoir 113 remaining stable at the vapor pressure of the cavitation fluid for a preset time period (e.g., greater than 10 minutes, or greater than 30 minutes, or greater than 1 hour, etc.).

Figure 20:
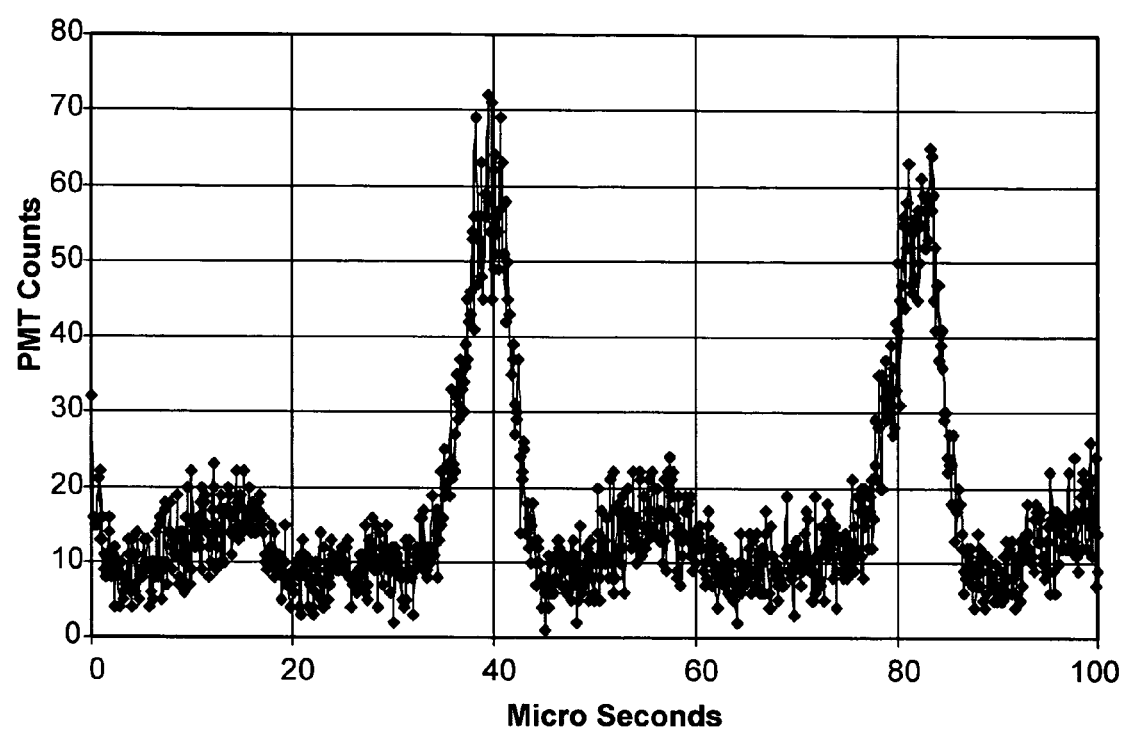
FIG. 20 is a graph of measured sonoluminescence data taken with a stainless steel sphere utilizing acetone at a temperature of $-27.5°$ C.

FIG. 20 is a graph that illustrates the sonoluminescence effect with a stainless steel sphere with an outer diameter of 9.5 inches and an inner diameter of 8 inches. Six acoustic drivers were mounted as illustrated in FIG. 2. The cavitation fluid was acetone cooled to a temperature of −27.5° C. The driving frequency was 23.52 kHz, the driving amplitude was 59 V RMS, and the driving power was 8.8 watts. Two acoustic cycles are shown in FIG. 20. It will be appreciated that the data shown in FIG. 20 is only provided for illustration, and that the invention is not limited to this specific configuration.

As will be understood by those familiar with the art, the present invention may be embodied in other specific forms without departing from the spirit or essential characteristics thereof. For example, by using a conductive material as the cavitation fluid, a magneto-hydrodynamic generator can be coupled to the system. Accordingly, the disclosures and descriptions herein are intended to be illustrative, but not limiting, of the scope of the invention which is set forth in the following claims.

What is claimed is:

1. A cavitation system comprising:
a cavitation chamber;
a cavitation fluid circulatory system comprising:
  a cavitation fluid reservoir, wherein a cavitation fluid reservoir fluid capacity is larger than a cavitation chamber fluid capacity;
  a cavitation fluid pump;
  a plurality of conduits coupling said cavitation chamber to said cavitation fluid reservoir and said cavitation fluid pump; and
  means for directing flow of a cavitation fluid contained within said circulatory system in either a first direction or a second direction, wherein in said first direction said cavitation fluid is circulated by said cavitation fluid pump out of said cavitation fluid reservoir through said cavitation chamber and back to said cavitation fluid reservoir, and wherein in said second direction said cavitation fluid is drained out of said cavitation chamber and returned to said cavitation fluid reservoir;
means for driving cavitation energy into said cavitation chamber; and
means for degassing said cavitation fluid contained within said circulatory system.

2. The cavitation system of claim 1, said cavitation chamber further comprising a first integral chamber conduit located within a lower portion of said cavitation chamber and a second integral chamber conduit located within an upper portion of said cavitation chamber, said first and second integral chamber conduits coupled to said cavitation fluid circulatory system, wherein when said directing means directs said flow of said cavitation fluid in said first direction said cavitation fluid enters said cavitation chamber through said first integral chamber conduit and exits said cavitation chamber through said second integral chamber conduit, and wherein when said directing means directs said flow of said cavitation fluid in said second direction said cavitation fluid exits said cavitation chamber through said first integral chamber conduit.

3. The cavitation system of claim 1, said cavitation fluid reservoir further comprising a first integral reservoir conduit located within a lower portion of said cavitation fluid reservoir and a second integral reservoir conduit located within an upper portion of said cavitation fluid reservoir, said first and second integral reservoir conduits coupled to said cavitation fluid circulatory system, wherein when said directing means directs said flow of said cavitation fluid in said first direction said cavitation fluid exits said cavitation fluid reservoir through said first integral reservoir conduit and enters said cavitation fluid reservoir through said second integral reservoir conduit, and wherein when said directing means directs said flow of said cavitation fluid in said second direction said cavitation fluid enters said cavitation fluid reservoir through said first integral reservoir conduit.

4. The cavitation system of claim 1, said cavitation fluid reservoir further comprising a first integral reservoir conduit located within a lower portion of said cavitation fluid reservoir and a second integral reservoir conduit located within an upper portion of said cavitation fluid reservoir, said first and second integral reservoir conduits coupled to said cavitation fluid circulatory system, wherein when said directing means directs said flow of said cavitation fluid in said first direction said cavitation fluid exits said cavitation fluid reservoir through said first integral reservoir conduit and enters said cavitation fluid reservoir through said second integral reservoir conduit, and wherein when said directing means directs said flow of said cavitation fluid in said second direction said cavitation fluid enters said cavitation fluid reservoir through said second integral reservoir conduit.

5. The cavitation system of claim 4, said cavitation fluid circulatory system further comprising a valve interposed between said first integral reservoir conduit and said cavitation fluid circulatory system, wherein when said directing means directs said flow of said cavitation fluid in said first direction said valve is in an open position and wherein when said directing means directs said flow of said cavitation fluid in said second direction said valve is in a closed position.

6. The cavitation system of claim 4, said cavitation fluid circulatory system further comprising a second cavitation fluid pump, wherein when said directing means directs said flow of said cavitation fluid in said second direction said second cavitation fluid pump pumps said cavitation fluid out of said cavitation chamber and back to said cavitation fluid reservoir.

7. The cavitation system of claim 1, wherein said directing means further comprises a plurality of valves coupled to said cavitation fluid circulatory system.

8. The cavitation system of claim 1, wherein said driving means further comprises at least one acoustic driver coupled to said cavitation chamber.

9. The cavitation system of claim 1, wherein said degassing means further comprises a vacuum pump coupled to said cavitation fluid reservoir.

10. The cavitation system of claim 9, wherein said vacuum pump operates intermittently during operation of said cavitation chamber.

11. The cavitation system of claim 9, wherein said vacuum pump operates continually during operation of said cavitation chamber.

12. The cavitation system of claim 1, said cavitation fluid circulatory system further comprising a bubble trap.

13. The cavitation system of claim 12, wherein said bubble trap is located within said cavitation fluid circulatory system adjacent to a cavitation fluid pump outlet.

14. The cavitation system of claim 1, said cavitation fluid circulatory system further comprising a filter.

15. The cavitation system of claim 1, said cavitation fluid circulatory system further comprising a heat exchange system.

* * * * *